US012588030B2

(12) United States Patent
Wong et al.

(10) Patent No.: US 12,588,030 B2
(45) Date of Patent: Mar. 24, 2026

(54) COMMUNICATIONS DEVICE, INFRASTRUCTURE EQUIPMENT, AND METHODS FOR DETERMINING WHETHER TO TRANSMIT FIRST DATA USING FIRST UPLINK COMMUNICATION RESOURCES

(71) Applicant: Sony Group Corporation, Tokyo (JP)

(72) Inventors: Shin Horng Wong, Basingstoke (GB); Martin Warwick Beale, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 350 days.

(21) Appl. No.: 17/798,886

(22) PCT Filed: Mar. 25, 2021

(86) PCT No.: PCT/EP2021/057797
§ 371 (c)(1),
(2) Date: Aug. 11, 2022

(87) PCT Pub. No.: WO2021/198029
PCT Pub. Date: Oct. 7, 2021

(65) Prior Publication Data
US 2023/0087594 A1    Mar. 23, 2023

(30) Foreign Application Priority Data
Apr. 1, 2020    (EP) ...................................... 20167632

(51) Int. Cl.
*H04W 72/00*        (2023.01)
*H04W 24/08*        (2009.01)
(Continued)

(52) U.S. Cl.
CPC ........... *H04W 72/23* (2023.01); *H04W 24/08* (2013.01); *H04W 72/1268* (2013.01)

(58) Field of Classification Search
CPC . H04W 72/23; H04W 24/08; H04W 72/1268; H04W 72/232; H04W 72/0446; H04W 72/53
See application file for complete search history.

(56) References Cited

U.S. PATENT DOCUMENTS

2020/0328866 A1    10/2020  Du et al.
2021/0051718 A1*    2/2021  Bhattad .................. H04W 72/23
(Continued)

FOREIGN PATENT DOCUMENTS

CN        109996341 A      7/2019
CN        112534917 A      3/2021
(Continued)

OTHER PUBLICATIONS

Sony (Sony: "Considerations on inter-UE transmission multiplexing & prioritization", R1-1900374, Jan. 2019).*
(Continued)

*Primary Examiner* — Lakeram Jangbahadur
(74) *Attorney, Agent, or Firm* — XSENSUS LLP

(57) ABSTRACT

A method of operating a communications device in a wireless communications network. The method includes receiving at a first time an uplink grant indication, the uplink grant indication indicating first uplink communication resources allocated for the transmission of first data by the communications device, receiving at a second time an uplink cancellation indication (UL-CI), the UL-CI indicating second uplink communication resources, the second uplink communication resources including at least a portion of the first uplink communication resources, and in response to receiving the uplink grant information and the uplink cancellation indication, determining based on the first time and the second time whether to transmit the first data using the first uplink communication resources.

18 Claims, 16 Drawing Sheets

(51) Int. Cl.
    *H04W 72/1268*     (2023.01)
    *H04W 72/23*     (2023.01)

(56)         References Cited

U.S. PATENT DOCUMENTS

| | | | |
|---|---|---|---|
| 2021/0185718 A1 | 6/2021 | Ying et al. | |
| 2021/0259010 A1* | 8/2021 | Yang .................. | H04W 72/566 |
| 2021/0376985 A1* | 12/2021 | Zhou ..................... | H04L 1/1812 |
| 2022/0353887 A1* | 11/2022 | Xu ........................ | H04L 1/0068 |
| 2022/0386355 A1* | 12/2022 | Yi ...................... | H04W 72/569 |

FOREIGN PATENT DOCUMENTS

| | | | |
|---|---|---|---|
| EP | 3720217 A1 | 10/2020 | |
| WO | 2019/129012 A1 | 7/2019 | |
| WO | 2020/026708 A1 | 2/2020 | |
| WO | WO-2020226837 A1 | 11/2020 | |

OTHER PUBLICATIONS

U.S. Appl. No. 62/977,080, prov080, filed Feb. 14, 2020.*

International Search Report and Written Opinion mailed on Jun. 29, 2021, received for PCT Application PCT/EP2021/057797, filed on Mar. 25, 2021, 14 pages.

Sony, "Considerations on inter-UE transmission multiplexing & prioritisation", 3GPP TSG RAN WG1 Ad-Hoc Meeting 1901, R1-1900374, Jan. 21-25, 2019, 6 pages.

Qualcomm Incorporated, "Uplink Inter-UE Tx Multiplexing and Prioritization", 3GPP TSG-RAN WGI #99, R1-1912963, Nov. 18-22, 2019, 6 pages.

Nokia et al., "Revised SID: Study on NR Industrial Internet of Things (IoT)", 3GPP TSG RAN meeting #81, RP-182090, Sep. 10-13, 2018, 5 pages.

Holma et al., "LTE for UMTS OFDMA and SC-FDMA Based Radio Access", John Wiley & Sons, 2009, 232 pages.

3GPP, "Study on Scenarios and Requirements for Next Generation Access Technologies; (Release 14)", 3GPP TR 38.913 V14.3.0, Jun. 2017, pp. 1-39.

Huawei et al., "New WID: Physical Layer Enhancements for NR Ultra-Reliable and Low Latency Communication (URLLC)", 3GPP TSG RAN Meeting #83, RP-190726, Mar. 18-21, 2019, 5 pages.

3GPP, "NR; Multiplexing and channel coding (Release 16)", 3GPP TS 38.212 V16.0.0, Dec. 2019, pp. 1-145.

3GPP, "Study on Scenarios and Requirements for Next Generation Access Technologies; (Release 14)", 3GPP TR 38.913 V14.2.0, Mar. 2017, pp. 1-38.

Apple Inc., "Remaining Details on Enhanced Inter-UE Prioritization/Multiplexing", 3GPP TSG RAN WG1 #100_e R1-2000857, Feb. 24, 2020.

Sony, "On the granularity of overlapping Reference Region for UL CI", 3GPP TSG RAN WG1 #100_e R1-2000586, Feb. 24, 2020.

Sony, "Remaining issues in inter-UE multiplexing", 3GPP TSG RAN WG1 #100b_e R1-2001817, Apr. 20, 2020.

Vivo, "Summary of email discussion [100e-NR-Llenh_URLLC-Inter_UE-02]", 3GPP TSG RAN WGI #100_e R1-2001291, Mar. 5, 2020.

* cited by examiner

COMMUNICATIONS DEVICE, INFRASTRUCTURE EQUIPMENT, AND METHODS FOR DETERMINING WHETHER TO TRANSMIT FIRST DATA USING FIRST UPLINK COMMUNICATION RESOURCES

CROSS-REFERENCE TO RELATED APPLICATIONS

The present application is based on PCT filing PCT/EP2021/057797, filed Mar. 25, 2021, which claims the Paris Convention priority of European patent application EP20167632.7, filed Apr. 1, 2020, the contents of each are hereby incorporated by reference.

BACKGROUND

Field

The present disclosure relates to communications devices, infrastructure equipment and methods for operating communications devices and infrastructure equipment in a wireless communications network.

Description of Related Art

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to support efficiently communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

Systems incorporating NR technology are expected to support different services (or types of services), which may be characterised by different requirements for latency, data rate and/or reliability. For example, a target for the Enhanced Mobile Broadband (eMBB) service is to provide a reliability of 10% with a user plane latency of 4 ms and a target for the Ultra Reliable & Low Latency Communications (URLLC) services is to provide a reliability of $1\text{-}10^{-5}$ (99.999%) or higher for one transmission of a 32 byte packet with a user plane latency of 1 ms [3]. In addition, systems may be expected to support further enhancements related to the Industrial Internet of Things (IIoT) in order to support services with new requirements of high availability, high reliability, low latency, and in some cases, high-accuracy positioning.

Data for transmission may therefore be associated with different services and/or with different quality of service requirements. There is therefore a need to provide techniques and equipment allowing data having different requirements to be efficiently transmitted within a wireless communications network.

SUMMARY

The present disclosure can help address or mitigate at least some of the issues discussed above.

Example embodiments of the present technique can provide a method of operating a communications device in a wireless communications network, the method comprising: receiving at a first time an uplink grant indication, the uplink grant indication indicating first uplink communication resources allocated for the transmission of first data by the communications device, receiving at a second time an uplink cancellation indication (UL-CI), the UL-CI indicating second uplink communication resources, the second uplink communication resources including at least a portion of the first uplink communication resources, and in response to receiving the uplink grant information and the uplink cancellation indication, determining based on the first time and the second time whether to transmit the first data using the first uplink communication resources.

Embodiments can provide for an effective method for allocating communication resources, for example in order to satisfy a latency or priority constraint associated with data.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
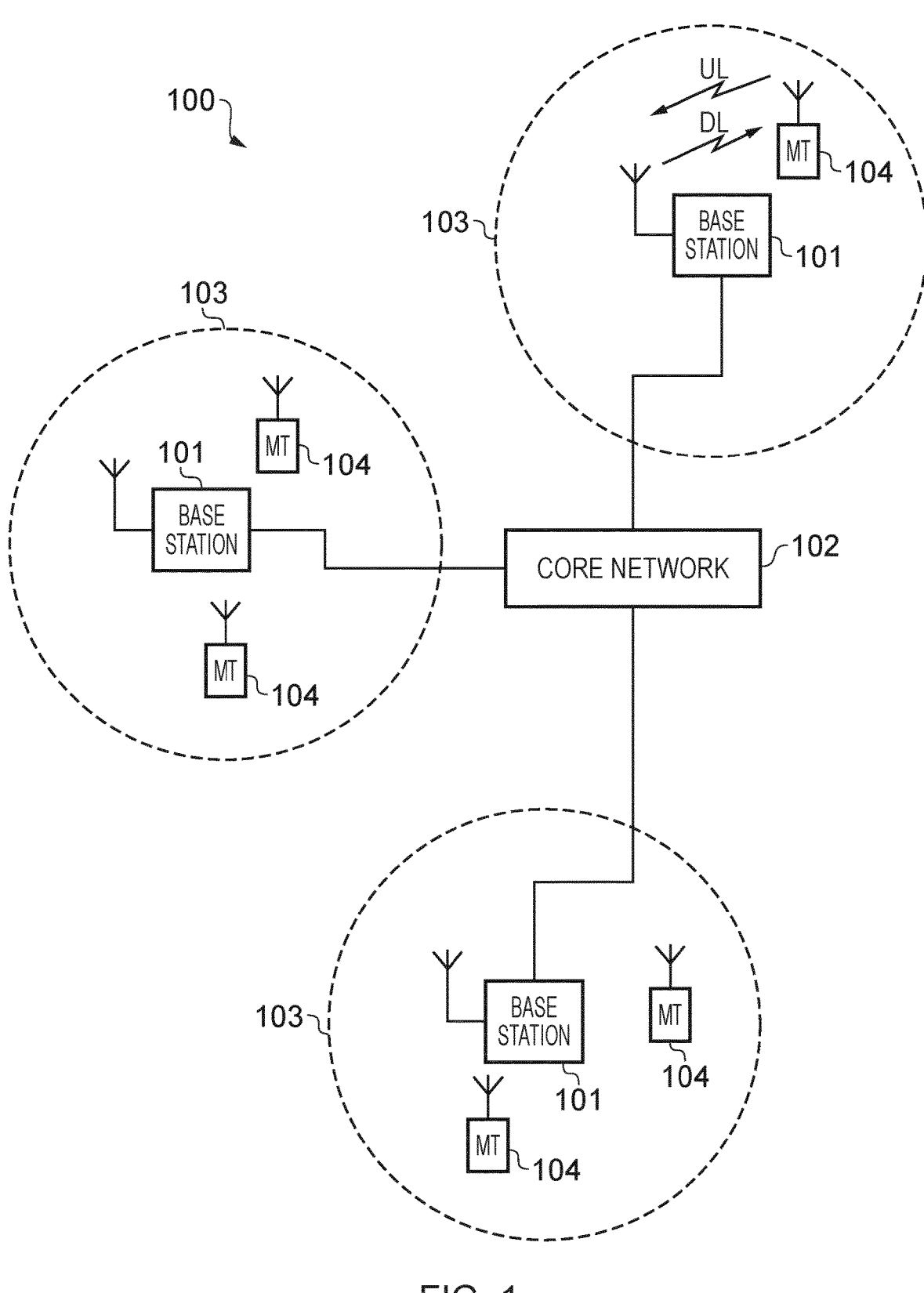
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
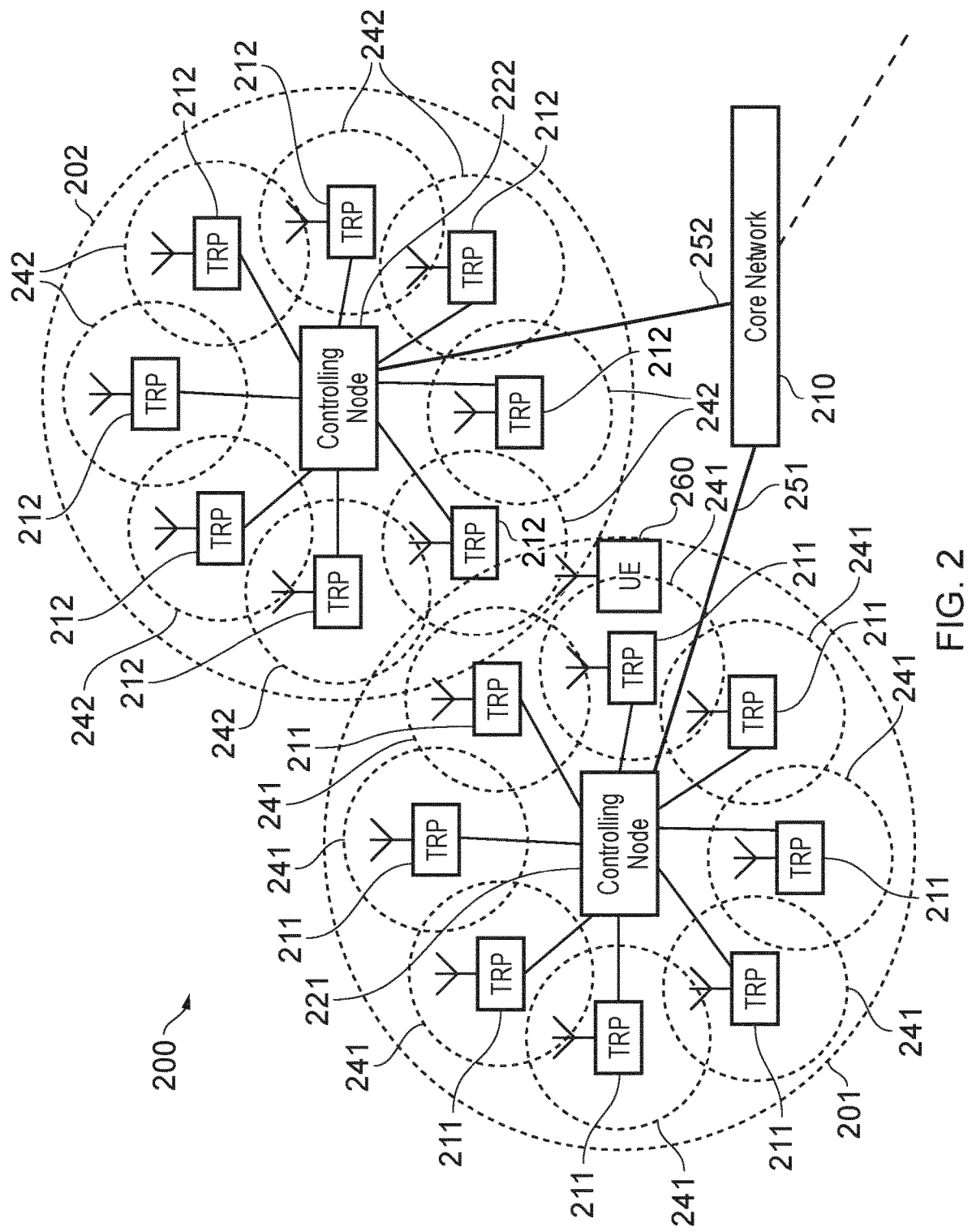
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated that in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
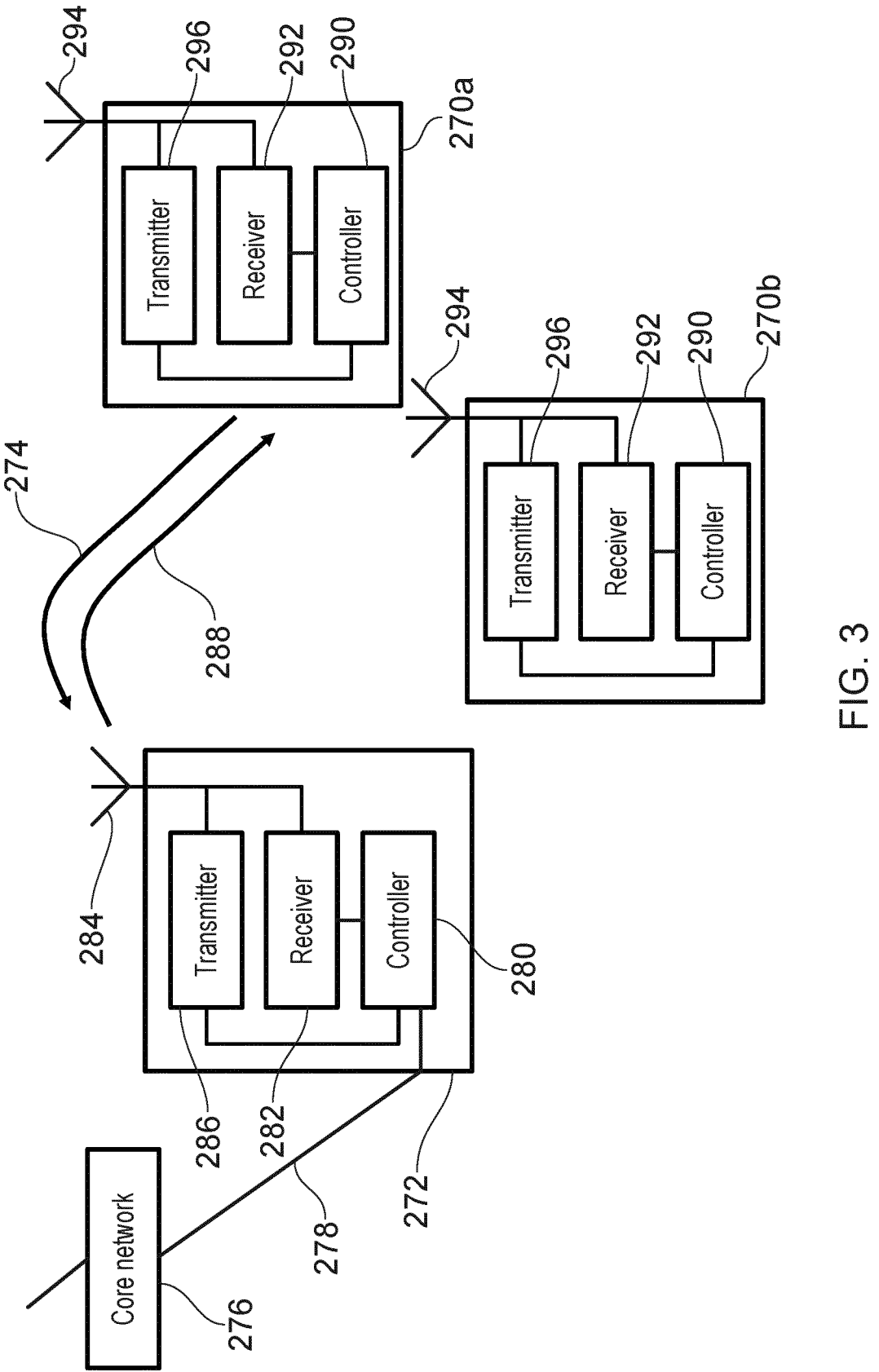
FIG. 3 is a schematic block diagram of an example infrastructure equipment and communications devices which may be configured in accordance with example embodiments.

A more detailed illustration of first and second UE/communications devices 270a, 270b (which may correspond to a communications device such as the communications device 260 of FIG. 2 or the communications device 104 of FIG. 1) and an example network infrastructure equipment 272, which may be thought of as an eNB (LTE base station) 101 or a combination of a controlling node 221 and TRP 211, is presented in FIG. 3. Where it is not necessary to distinguish between the first communications device 270a and the second communications device 270b, reference will be made to communications device 270.

As shown in FIG. 3, the communications device 270 is shown to transmit uplink data to the infrastructure equipment 272 via uplink resources of a wireless access interface as illustrated generally by an arrow 274 from the communications device 270 to the infrastructure equipment 272. The communications device 270 may similarly be configured to receive downlink data transmitted by the infrastructure equipment 272 via downlink resources as indicated by an arrow 288 from the infrastructure equipment 272 to the communications device 270. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, each communications device 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of each communications device 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Uplink Cancellation Indication

If a first communications device (such as the communications device 104 of FIG. 1, or the first communications device 270a of FIG. 3) is allocated communication resources for the transmission of first data, it may be that a portion of those communication resources is subsequently allocated for the transmission of second data by a second communications device 270b. The selection of the communication resources associated with this later allocation may be based on quality of service (e.g. latency, priority) requirements associated with the second data.

Figure 4:
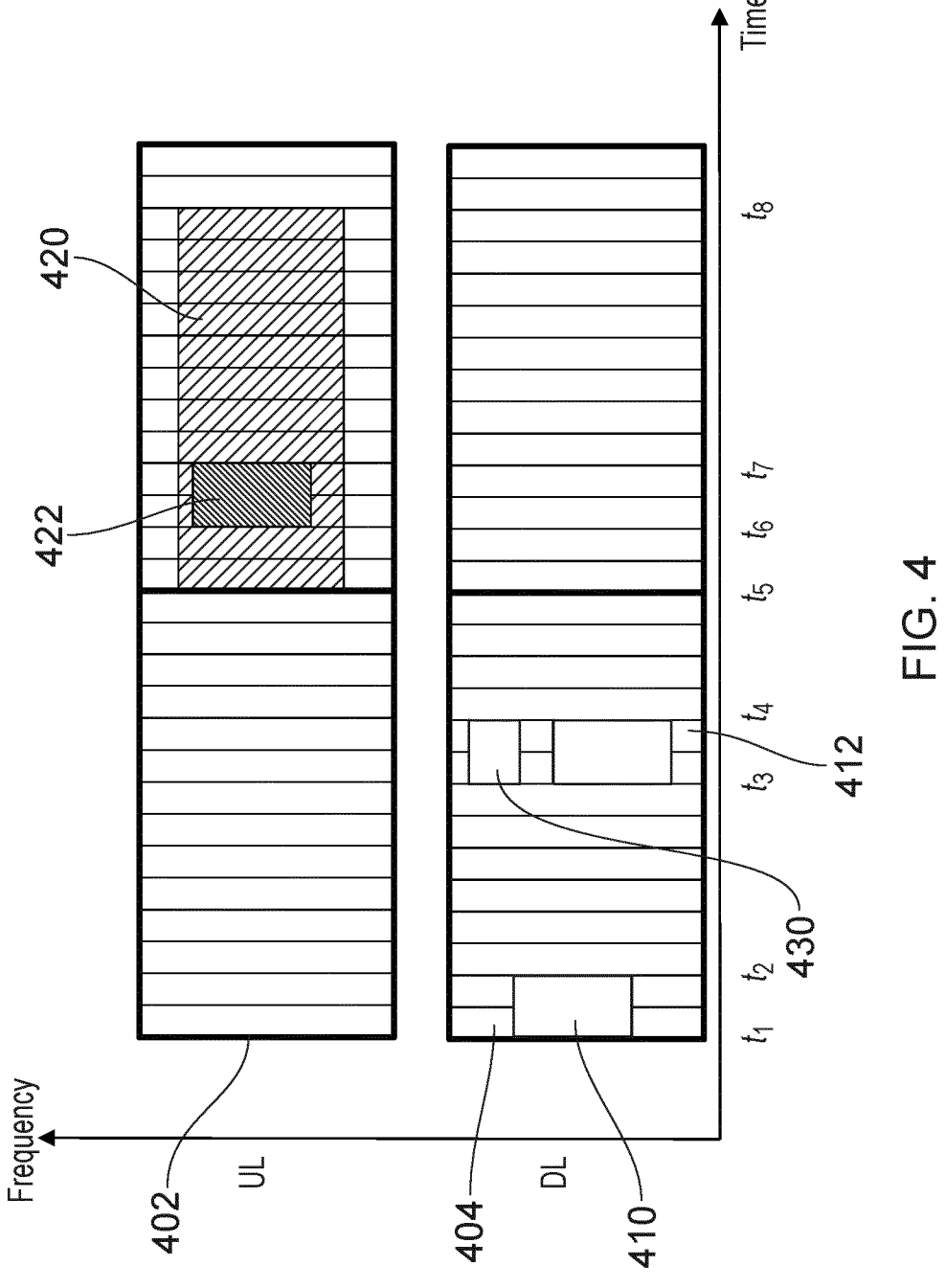
FIG. 4 illustrates a use of an uplink cancellation indicator (UL-CI) in accordance with conventional techniques.

FIG. 4 illustrates a scenario in which such a second allocation may occur.

FIG. 4 shows uplink communication resources 402 and downlink communication resources 404, which are provided simultaneously using different frequency ranges of a wireless access interface (i.e. using frequency division duplexing, FDD). It will be appreciated that although examples and embodiments described herein may use FDD, the present technique is not so limited and may be used in other wireless access interfaces, such as one using time division duplexing (TDD).

In the example of FIG. 4, a first uplink grant 410 is transmitted at time t1 by an infrastructure equipment (such as the infrastructure equipment 272 of FIG. 3). The first uplink grant 410 allocates first communication resources 420 to the first communications device 270a for the transmission of first uplink data.

Subsequently, at time t3, a second uplink grant 412 is transmitted by the infrastructure equipment 272. The second uplink grant 412 allocates second communication resources 422 to the second communications device 270b for the uplink transmission of second uplink data. The second communication resources 422 comprise at least a part of the first communication resources 420; such an allocation may be referred to herein as 'pre-emption', and results in a collision.

The second communication resources 422 may be allocated in response to a determination by the infrastructure equipment 272 that the second communications device 270b has uplink data for transmission, whose transmission must (according to quality of service requirements associated with the data) be completed by t7, that is, before time t8 at which the first communication resources 420 end.

It will however be appreciated that the reason for the allocation of the second communication resources 420 may not be limited to such scenarios, and the present disclosure is not so limited.

According to conventional techniques, the infrastructure equipment 272 may transmit an uplink cancellation indication (UL-CI) 430. The UL-CI 430 may indicate that some communication resources which have previously been indicated as allocated as part of a particular first resource allocation have, subsequent to the first resource allocation, been allocated as part of a later second resource allocation. In some embodiments, the first resource allocation may have been speculative, that is, may have been made by the infrastructure equipment 272 without having determined that the beneficiary communications device of the first resource allocation has data to transmit using the allocated resources, or is otherwise able to make use of the allocated resources. For example, the first resource allocation may be a part of a periodic grant of resources, such as by means of a configured grant.

In general, an in accordance with some embodiments of the presently disclosed technique, the reason for the indication of resources within the UL-CI 430 is not limited to such scenarios, and resources may be indicated by the UL-CI 430 for any reason. For example, resources may be indicated in order to reduce a level of uplink interference.

Accordingly, resources which are described herein as being 'indicated' by an UL-CI may correspond to resources which have been allocated to one or more communications devices and/or may correspond to resources which the infrastructure equipment 272 requires are not used by one or more recipients of the UL-CI.

In any case, in accordance with conventional techniques, in the example of FIG. 4, the purpose of the UL-CI 430 is to indicate to the first communications device 270a, which was allocated resources by means of the first resource allocation, that the first resource allocation is no longer valid, and that the first communications device 270a should not transmit using some or all of the previously allocated communication resources.

The UL-CI 430 may be transmitted within downlink control information (DCI) and may be addressed to multiple communications devices, e.g. by being transmitted using a group common (GC) DCI. Accordingly, it may be received and processed by communications devices other than the first communications device 270a.

The UL-CI 430 may accordingly, conventionally and in some embodiments of the present technique, comprise indications of different resources, which may be indicated for different reasons. A communications device which receives the UL-CI 430 may not know why a resource is indicated. According to the conventional techniques, the communications device which has received the UL-CI cancels its transmission if the indicated resource overlaps with its transmission.

For example, as in the example of FIG. 4, the infrastructure equipment 272 may transmit the UL-CI 430 indicate resources which a communications device is to refrain from using, in order to avoid a collision arising from a conflicting subsequent resource allocation. The UL-CI 430 may alternatively or additionally indicate other resources, for other reasons. Generally, a communications device which receives a UL-CI may not know the reason for the indication of particular resources in the UL-CI.

Similarly, because the UL-CI may be addressed to multiple communications devices, it may comprise indications of resources which are of no relevance to a particular communications device, but may influence the behaviour of another communications device.

Accordingly, in some embodiments of the present techniques, a communications device may receive a UL-CI which indicates certain communication resources, but which does not indicate any further information as to why those communication resources are indicated.

The communication device detecting and reading the UL-CI does not need to know the reason behind the indication but it needs to follow the UL-CI instruction, i.e. if the communication device's uplink transmission overlaps partially or fully with one or more of the indicated sub-portions, the communication device will cancel its uplink transmission.

In accordance with some conventional techniques, the UL-CI 430 may comprise an indication of communication resources, the indicated communication resources including those allocated by both the first and second resource allocations.

A communications device which receives the UL-CI 430 and which has previously received an allocation of communication resources falling within the indicated communication resources and may refrain from transmitting using its resource allocation. The indicated communication resources may have been indicated because of a pre-emption, but this (the reason for their indication) may not be indicated by the UL-CI or accordingly determined by the communications device.

Figure 5:
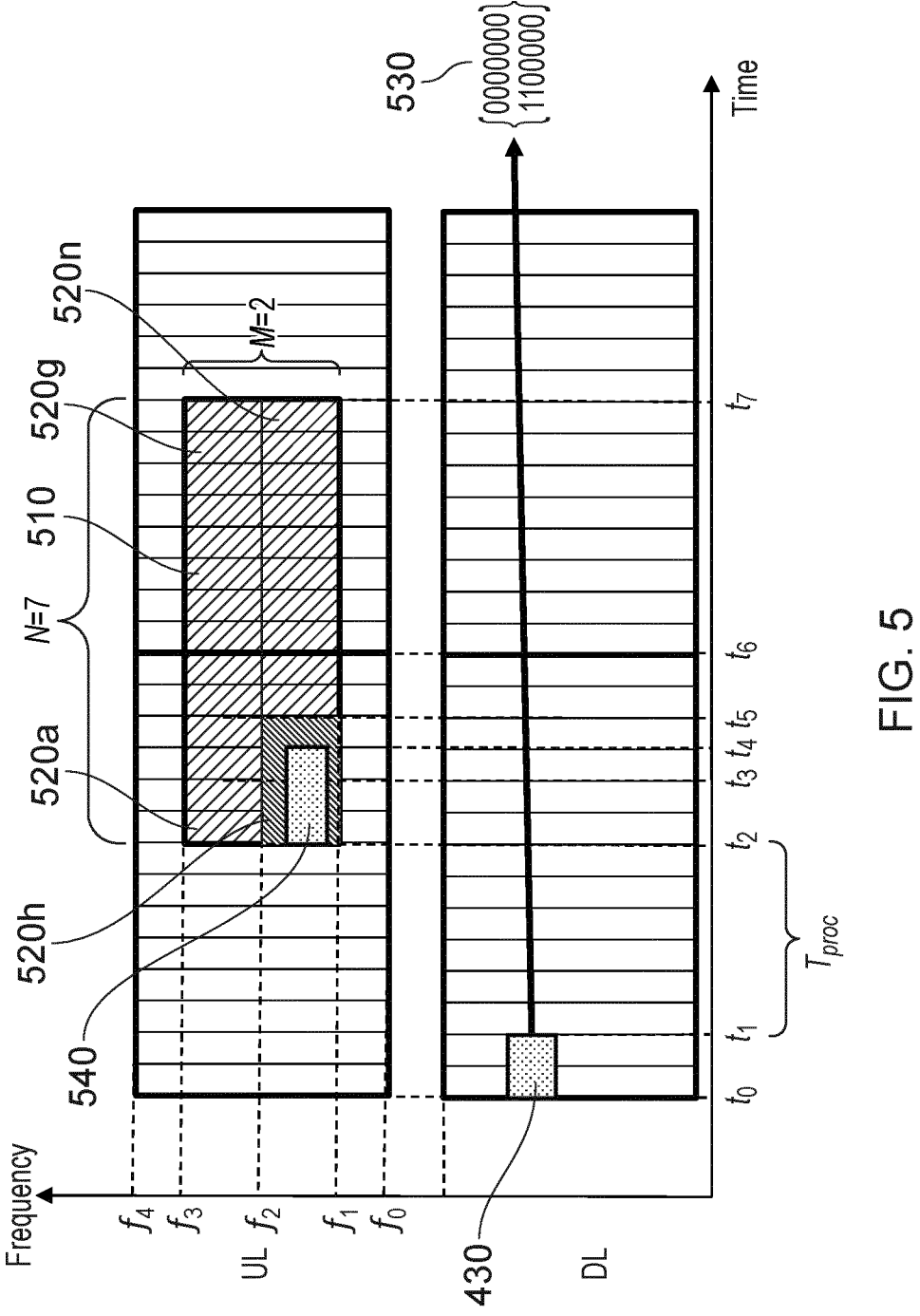
FIG. 5 illustrates a use of an uplink cancellation indicator in accordance with conventional techniques.

A particular example is shown in FIG. 5. In the example of FIG. 5, which may be in accordance with some conventional techniques, the UL-CI 430 is transmitted in accordance with a predetermined schedule. The UL-CI 430 transmitted as shown in FIG. 5 is associated with a reference uplink region (RUR) 510. The RUR 510 consists of one or more portions of uplink communications resources; in the example of FIG. 5, the RUR 510 associated with the UL-CI 430 is divided into fourteen sub-portions 520a-520n.

Where the wireless access interface is based on orthogonal frequency division multiplexing (OFDM), as in FIG. 5, each sub-portion 520a-520n may extend in time over two OFDM symbol periods.

In the frequency domain, in FIG. 5, each of the sub-portions 520a-520g extend from frequency f2 to f3, and each of the sub-portions 520h-520n extend from frequency f1 to f2. Thus, the RUR 510 comprises two rows in the frequency domain (M=2) each of seven sub-portions separated in the time domain (N=7), and collectively spans frequencies from frequency f1 to frequency f3 and spans time from time t2 until time t7.

In accordance with conventional techniques and some embodiments of the presently disclosed technique, the UL-CI 430 may indicate sub-portions (of the sub-portions 520a-n) which include subsequently allocated resources allocated for the transmission of data by one or more communications devices, when those resources (at least partially) overlap with (i.e. collide with) resources which have also been allocated for the transmission of data by a different communications device.

The indication may be by means of a bit within a bitmap (such as the bitmap 530 shown in FIG. 5 included in the UL-CI 430). For example the bit being '1' may indicate that the sub-portion includes the subsequently allocated resources, and '0' if the sub-portion does not include the subsequently allocated resources.

In the example of FIG. 5, a subsequent resource allocation 540 falls within the sub-portions 520h and 520i (indicated in FIG. 5 by hatching which differs in direction from that of the other sub-portions of the RUR 510). At least a portion of the subsequent resource allocation 540 overlaps with an earlier resource allocation to a different communications device (not shown), and accordingly, two corresponding bits in the bitmap 530, associated with the sub-portions 520h and 520i are set to '1'.

A communications device which receives the UL-CI 430 can thus determine that a collision has occurred in respect of a previous resource allocation if that (previous) resource allocation allocated communication resources which are within the sub-portion(s) of an RUR which are indicated as containing subsequently allocated resources.

A communications device may receive a UL-CI having one or more sub-portions indicated (e.g. having corresponding bits in a bitmap set to '1') which do not include any resources which have been allocated to that communications device. Accordingly, such a communications device may determine that the resources allocated to it for the transmission of data have not been pre-empted, and may accordingly transmit the data using the allocated resources.

In the example of FIG. 5 and in some embodiments of the present technique, the start of the RUR 510 occurs a predetermined duration, $T_{PROC}$, after the end of the associated UL-CI 430.

It will be appreciated that the UL-CI 430 may not indicate exactly which resources within the affected sub-portion(s) are the subject of a collision, and there may be a risk of a 'false positive'. A false positive may occur where a portion of allocated resources falls within the boundary of a sub-portion indicated as including a collision, while not in fact overlapping with any other allocated resources and therefore not being part of the collision.

It will be appreciated that the number of sub-portions within the RUR 510 is not limited to 14; in some embodiments, the number may be any of {1, 2, 4, 5, 7, 8, 10, 14, 16, 20, 28, 32, 35, 42, 56, 112} and in some embodiments, may be configurable by the infrastructure equipment 272.

In accordance with conventional techniques, the bitmap may indicate all sub-portions which include the resources of the subsequent (colliding) resource allocation. However, in some embodiments of the present technique, the bitmap indicates only those sub-portions which include the portion(s) of the colliding resource allocation which overlap with the earlier resource allocation.

Figure 6:
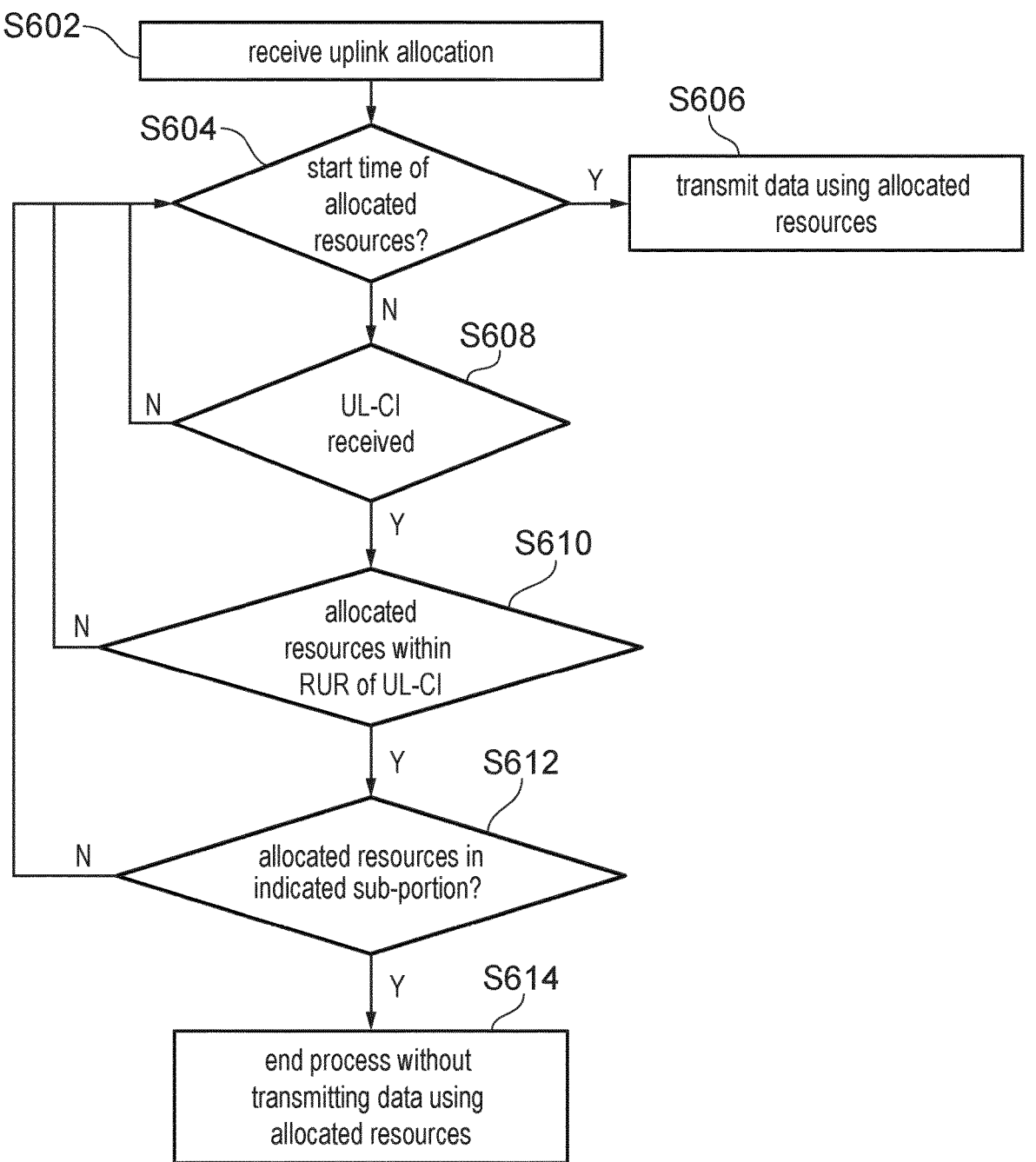
FIG. 6 is a flow chart showing a process which may be carried out by a communications device in accordance with conventional techniques.

In accordance with conventional techniques, a communications device may perform a process as illustrated by the flow-chart of FIG. 6.

The process starts at step S602, when the communications device receives an allocation of first uplink communication resources. In response to receiving the allocation, the communications device may initiate preparation steps necessary for being able to transmit the data using the first uplink communication resources. These preparation steps may continue during the subsequent steps in the process. Control then passes to step S604.

At step S604, the communications device determines whether the start time of the first uplink communication resources has been reached. If it has, then control passes to step S606 and the communications device transmits data using the first uplink communication resources. This may correspond to the case where no UL-CI causing the communications device to determine that it is not to transmit the data using the first uplink communication resources has been received prior to the start time of the allocated resources.

According to some conventional techniques the process may end at step S606.

However, in accordance with some conventional techniques, the communications device may determine whether it has received an UL-CI while transmitting the data. If it does, then the determination in steps S608, S610 and S612 may be made, as described below. If, as a result of such determinations, step S614 is reached while the communications device is transmitting, then the transmission may cease.

If the start time of the first uplink communication resources has not been reached, then control passes to step S608. At step S608, the communications device determines whether it has received a UL-CI. If not, the control returns to step S604. The determinations at step S604 and step S606 may be repeated continuously or periodically until a positive determination is made at one of these steps.

If the communications device has received a UL-CI, the control passes to step S610. At step S610, the communications device determines whether any portion of the first uplink communication resources are within an RUR associated with the UL-CI. If no portion of the first uplink communication resources is within the RUR associated with the UL-CI, then control returns to step S604; otherwise, control passes to step S612.

At step S612, the communications device determines whether the UL-CI indicates that any portion of the first uplink communication resources are within an indicated sub-portion of the RUR associated with the UL-CI. As described above, the UL-CI may indicate such resources because they include a subsequent resource allocation which pre-empts an earlier resource allocation.

If none of the first uplink communication resources are within an indicated sub-portion, then control returns to step S604. Otherwise (i.e. some or all of the first uplink communication resources are within one or more indicated sub-portion(s)), control passes to step S614, and the process ends, without any transmission by the communications device using the first uplink communication resources.

Thus, in accordance with conventional techniques, a communications device may cancel a transmission and refrain from transmitting using allocated uplink communication resources, if, for example, the allocated communication resources have been also allocated for a different transmission.

In accordance with conventional techniques, and in accordance with some embodiments of the presently disclosed techniques, after ending the process of FIG. 6 without transmitting the data, the communications device may subsequently transmit the data using other allocated resources, if the conditions for transmitting the data using those other allocated resources are satisfied (e.g. step S606 is reached in respect of those resources).

The process whereby a subsequent allocation uses communication resources previously allocated by means of an earlier allocation is referred to herein as 'pre-emption'. It has been recognised that pre-emption may occur in respect of allocations made to different communications devices ("inter-UE pre-emption") and in respect of allocations made to a single communications device ("intra-UE pre- emption").

A communications device may be configured (e.g. by the infrastructure equipment) to monitor UL-CI transmissions and to selectively cancel an uplink transmission based on an indication of resources in a monitored UL-CI, when the indicated resources overlap with resources allocated for the uplink transmission. In particular, a communications device which transmits only low priority data or data which may be sent with a high latency may be configured to monitor and react to UL-CIs, because resources allocated for the transmission of such data may be pre-empted.

On the other hand, for example, a communications device which transmits only high priority and/or very low latency transmissions may be configured not to monitor or react to UL-CIs, because a high priority or low latency transmission would not be pre-empted.

However, it has been recognised that a communications device may be both configured to monitor and read the UL-CIs and configured to transmit data such that allocations for the transmission of such data may pre-empt earlier resource allocations.

It has been recognised that the UL-CI may be broadcast or multicast to multiple communications devices, and does not identify, for an indicated sub-portion, which resource allocation is in fact the earlier allocation which is being pre-empted, and which is the (later) pre-empting allocation which results in the collision. In the event of a collision between resources allocated (first) to a first communications device and (second, resulting in the collision) to a second communications device, a UL-CI may be transmitted indicating the resulting collision.

If the second communications device is configured to monitor and react to the UL-CI, then the second communications device will, in accordance with the conventional techniques described above, cancel its uplink transmission, even though it was the allocation of resources for that transmission which resulted in the transmission of the UL-CI, indicating the resources allocated to the second communications device.

This may be in addition to the cancellation by the first communications device of its transmission. Accordingly, it may be that neither communications device transmits, and the communication resources are wasted.

Referring to the example illustrated in FIG. 4, it may be that both the first communications device 272a and the second communications device 272b are configured to monitor the resources used for the transmission of the UL-CI 430, and accordingly both the first communications device 272a and the second communications device 272b receive the UL-CI 430. Because the UL-CI 430 indicates resources (e.g. resources 422 corresponding to the second resource allocation) which are a part of the first communication resources 420, the first communications device 272a determines that it should refrain from transmitting using the first communication resources 420.

However, because the UL-CI 430 indicates resources which are a part of the second communication resources 422, the second communications device 272b also determines that it should refrain from transmitting using the second communication resources 420.

Thus, the UL-CI 430 is intended to permit the second communications device 272b to transmit data with a low latency and without uplink interference caused by an overlapping transmission by the first communications devices 272a, but may have the unintended effect of causing the second communications device 272*b* to also refrain from transmitting using the second communication resources 422.

There is thus a need to resolve this 'false positive' reaction to a UL-CI.

Embodiments of the present technique can provide a method of operating a communications device in a wireless communications network, the method comprising: receiving at a first time an uplink grant indication, the uplink grant indication indicating first uplink communication resources allocated for the transmission of first data by the communications device, receiving at a second time an uplink cancellation indication (UL-CI), the UL-CI indicating second uplink communication resources, the second uplink communication resources including at least a portion of the first uplink communication resources, and in response to receiving the uplink grant information and the uplink cancellation indication, determining based on the first time and the second time whether to transmit the first data using the first uplink communication resources.

In particular some embodiments of the present technique can provide a method of operating a communications device in a wireless communications network, the method comprising: receiving an uplink grant indication, the uplink grant indication indicating first uplink communication resources allocated for the transmission of first data by the communications device, receiving at a second time an uplink cancellation indication (UL-CI), the UL-CI indicating resources within a reference uplink region, the reference uplink region associated with the UL-CI and defining uplink communication resources, determining that the first uplink communication resources are within the resources indicated by the UL-CI, determining a time window associated with the UL-CI, determining that the uplink grant indication was received within the time window associated with the UL-CI, and in response to determining that the uplink grant indication was received within the time window associated with the UL-CI, transmitting the first data using the first uplink communication resources.

Accordingly, a communications device may be configured to ignore a received UL-CI if the uplink grant is received within a time window associated with the UL-CI, and may transmit using allocated uplink resources, even if the UL-CI indicates some or all of the allocated uplink resources.

Embodiments of the present technique can avoid the need for additional information to be conveyed within the UL-CI.

Embodiments of the present technique may also be independent of other priority indications (such as a physical layer priority) having as a purpose the prioritisation of data or resources within a same communications device. Accordingly, embodiments of the present technique can apply even if priority indications used for intra-communications device prioritisation applicable to data to be transmitted using colliding communication resources (or to the communication resources themselves) are not provided or are equal.

According to some embodiments of the present technique, a communications device which receives a UL-CI, determines a time window associated with the UL-CI. If the communications device additionally receives a grant of uplink communication resources, the grant being received during the time window, then those uplink communication resources are used for a data transmission, irrespective of any indication applicable to those resources, within the UL-CI. If, in some embodiments, the grant is received outside of the time window and the UL-CI indicates some or all of the allocated resources , then the communications device does not transmit using the allocated resources.

In some embodiments, both scenarios may arise in respect of the same grant, if two UL-CIs are received, where the grant is within the window associated with one UL-CI, and is outside the window of the other UL-CI.

Figure 7:
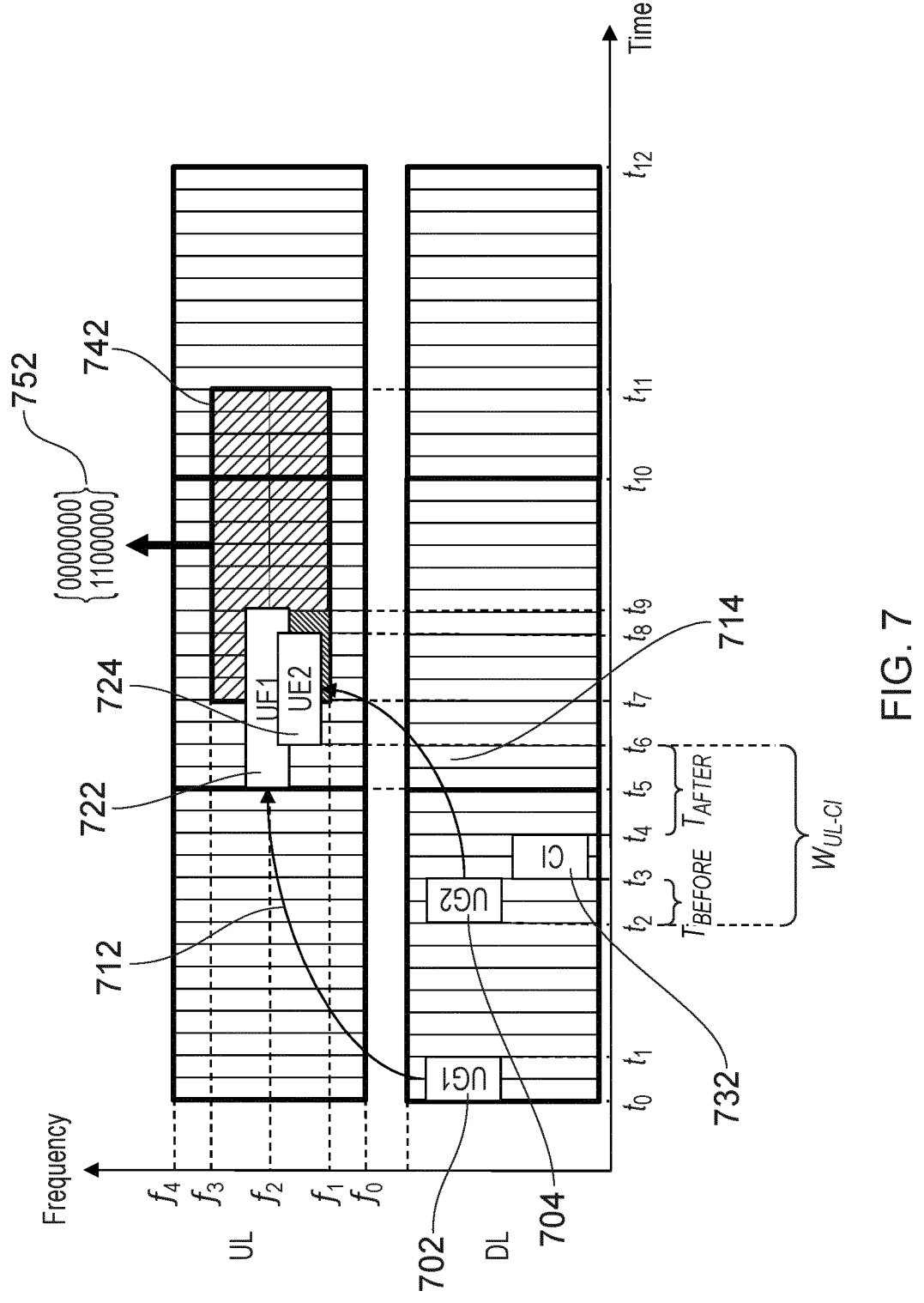
FIG. 7 shows an example of resource allocations and transmissions, including a UL-CI, in accordance with some embodiments of the present disclosure.

FIG. 7 shows an example of transmissions in accordance with some embodiments of the present technique.

From time t0 until time t1, the infrastructure equipment 272 transmits a first uplink grant 702 to the first communications device 270*a*, allocating (as indicated by the first arrow 712) first uplink communication resources 722 which extend from time t5 until time t9.

Subsequently, the infrastructure equipment determines that second uplink resources 724 are to be allocated to the second communications device 270*b*. In response, it transmits from time t2 to t3 a second uplink grant 704 allocating (as indicated by the first arrow 714) the second uplink communication resources 724 to the second communications device 270*b*.

The infrastructure equipment 272 determines that the first communication resources 722 and the second communication resources 724 partially overlap. If both the first communications device 270*a* and the second communications device 270*b* transmit using their respective allocations, then there will be a high probability that the infrastructure equipment 272 does not decode the data transmitted by the first and second communications devices 270*a*, 270*b* correctly.

The data to be transmitted by the second communications device 270*b* may have a quality of service requirement for low latency and/or high priority transmission, relative to the quality of service requirement associated with the data to be transmitted by the first communications device 270*a*.

Accordingly, in order to indicate to the first communications device 270*a* that the first communications device 270*a* should refrain from transmitting using the first communication resources 722, the infrastructure equipment 272 transmits, from time t3 to time t4, an uplink cancellation indication (UL-CI) 732.

In the example of FIG. 7, the UL-CI is formed according to conventional techniques as described above in respect of the example of FIG. 5: that is, the UL-CI 732 is associated with an RUR 742, divided into sub-portions. The UL-CI 732 comprises a bitmap 752, with one bit associated with each sub-portion of the RUR 742. For each sub-portion in which resources of the first communication resources 722 and resources of the second communication resources 724 overlap, the corresponding bit in the bitmap 752 is set to '1'. Alternatively, in some embodiments, a bit corresponding to a sub-portion is set to '1' (i.e. the sub-portion is 'indicated') if that sub-portion includes any portion of the second communication resources 724. However, it will be appreciated that in this case, the indicated sub-portions will include one or more sub-portions in which the first communication resources 722 and the second communication resources 724 overlap.

In the example of FIG. 7, the UL-CI 732 is associated with a time window $W_{UL-CI}$, which extends from time t2 to time t6. Irrespective of the contents of the UL-CI 732, any communications device (such as the communications device 270*b*) receiving an uplink grant transmitted during this time window (such as the second uplink grant 704) shall not, in accordance with embodiments of the present technique, refrain from transmitting data using the granted resources, based on the UL-CI 732.

In the example of FIG. 7, both the first and second communications devices 270*a*, 270*b* receive the UL-CI 732. This may be because, in accordance with some embodiments of the present technique, both are configured to monitor downlink communication resources for UL-CI transmissions which include those resources used to transmit the UL-CI 732. In some embodiments, the downlink communication resources which are to be monitored in accordance with the configuration are periodic.

In the example of FIG. 7, in accordance with some embodiments of the present technique, the time window $W_{UL\text{-}CI}$ starts a duration $T_{BEFORE}$ prior to the start of transmission of the UL-CI 732 at time t3, so that the time window starts at time t2.

In the example of FIG. 7, in accordance with some embodiments of the present technique, the time window $W_{UL\text{-}CI}$ ends a duration $T_{AFTER}$ after the end of the transmission of the UL-CI 732 at time t4, so that the time window ends at time t6.

The first communications device 270a determines, based on the UL-CI 732 (and specifically, in the example of FIG. 7, based on the bitmap 752), that at least a portion of the first communication resources 722 is within a sub-portion indicated by the bitmap 752. Because the first uplink grant 702 is received outside of the time window $W_{UL\text{-}CI}$, the first communications device 270a cancels its transmission and refrains from transmitting using the first communication resources 722.

The second communications device 270b may determine, based on the UL-CI 732 that at least a portion of the second communication resources 724 is within a sub-portion indicated by the bitmap 752. However, because the second uplink grant 704 is received within the time window $W_{UL\text{-}CI}$, the second communications device 270b does not cancel its transmission and transmits using the second communication resources 722. In some embodiments of the present technique, the second communications device 270b may transmit using the second communication resources 722 only if no UL-CI is received which satisfies both the conditions:

that at least a portion of the second communication resources 724 is within a sub-portion indicated by the UL-CI, and that the second uplink grant 704 was received outside of the time window associated with the UL-CI.

Accordingly, embodiments of the present technique can prevent a communications device from cancelling a transmission in response to a UL-CI which was transmitted with the purpose of informing a different communications device of a restriction applicable to the indicated communication resources (e.g. as a result of a collision). In some embodiments, the method of determining the time window $W_{UL\text{-}CI}$ may be predetermined (e.g. configured by RRC configuration, specified in standards, or signalled in any appropriate manner, such as by broadcast information) so that no additional information is needed within the UL-CI itself.

In some embodiments, the time window $W_{UL\text{-}CI}$ starts prior to the time at which the UL-CI is transmitted; in other words, $T_{BEFORE}$ is greater than 0, as illustrated in the example of FIG. 7. Accordingly, an uplink grant corresponding to the second communication resources (i.e. the uplink grant which results in the collision) may be transmitted before the corresponding UL-CI which is sent by the infrastructure equipment in response to, for example, the overlapping allocation. This allows the second communications device to initiate steps, such as encoding, in respect of the data to be transmitted using the second communication resources, before the UL-CI is transmitted. It also permits more flexibility in transmitting the uplink grants, considering that UL-CI transmission may be constrained according to a predetermined configuration, and may occur with relatively low frequency (i.e. high periodicity between UL-CI transmission opportunities).

In some embodiments, $T_{BEFORE}$ is zero, i.e. the time window does not start prior to the time at which the UL-CI is transmitted. Accordingly, in such embodiments, a communications device receiving a UL-CI after having received an uplink grant may process the UL-CI and refrain from using communication resources allocated by the uplink grant if indicated by the UL-CI.

In some embodiments, the time window $W_{UL\text{-}CI}$ may end at a time corresponding to the earliest time associated with communication resources which may be indicated by the UL-CI. For example, where the UL-CI is associated with an RUR, the time window $W_{UL\text{-}CI}$ may end at the start time corresponding to the resources of the RUR.

Figure 8:
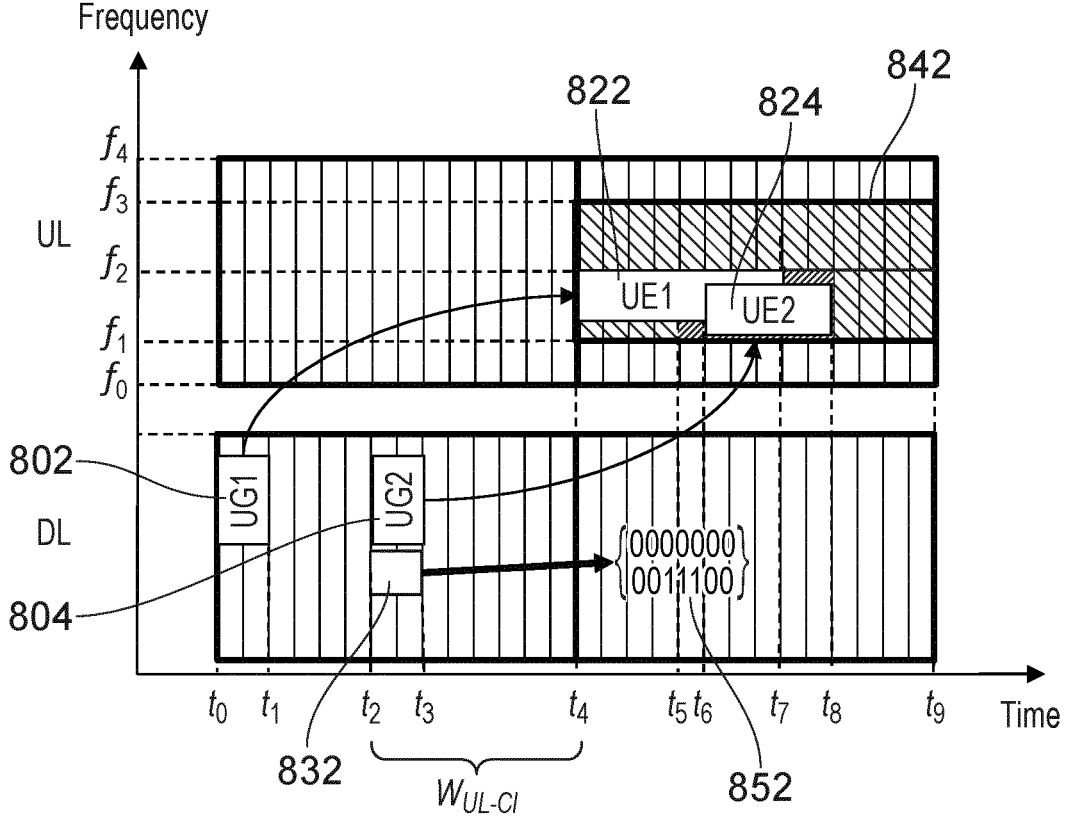
FIG. 8 shows an example of resource allocations and transmissions, including a UL-CI, in accordance with some embodiments of the present disclosure.

FIG. 8 shows an example of transmissions in accordance with some embodiments of the present technique, in which $T_{BEFORE}$ is zero and in which the time window $W_{UL\text{-}CI}$ ends at the start time corresponding to the resources of the RUR.

In the example of FIG. 8, the first uplink grant 802 allocates first communication resources 822 and the second uplink grant 804 allocates second communication resources 824. Because the second communication resources 824 overlap with the first communication resources 822, sub-portions of the RUR 842 which include the second communication resources 824 are indicated by the UL-CI 832, by means of bitmap 852. Because the first uplink grant 802 was transmitted and received outside of the time window $W_{UL\text{-}CI}$, the first communications device 270a processes the UL-CI 832, identifies that the first communication resources 822 fall within the sub-portions of the RUR indicated as having within them resource allocated by a pre-empting resource allocation, and refrains from transmitting using the first communication resources 822.

Because both the second uplink grant 802 and the UL-CI 832 were transmitted from time t2 to time t3, the second uplink grant 802 was transmitted and received within of the time window $W_{UL\text{-}CI}$, which started at time t2 and ends at time t4 (the start time of the RUR 842). Accordingly, the second communications device 270b ignores the UL-CI 832 insofar as it relates to the second communication resources 824, and transmits data using the second communication resources 824.

In some embodiments, respective RURs associated with different UL-CIs may overlap. Accordingly, particular communication resources may be indicated by two or more UL-CIs. In accordance with some embodiments of the present technique, the communications device processes each UL-CI independently, by determining for each UL-CI:

whether the UL-CI indicates uplink communication resources allocated by means of an uplink grant for the transmission of data by the communications device, and whether the uplink grant was received within the time window $W_{UL\text{-}CI}$ associated with the UL-CI.

In some embodiments, if the uplink grant was received outside of a time window $W_{UL\text{-}CI}$ associated with any UL-CI which indicates such resources, then the communications device refrains from transmitting data using the uplink communication resources.

Accordingly, embodiments of the present technique can provide for the transmission of a UL-CI which causes a communications device to refrain from using allocated communications resources, even if another UL-CI indicating the resources (which may be, e.g., resources corresponding to a collision) would be ignored by the communications device.

In some embodiments, a subsequent UL-CI can thus override an earlier UL-CI in respect of the same communication resources and same communications device. In some such embodiments, the infrastructure equipment 272 may rely on this principle to allow communication resources, whose allocation causes a collision as a result of pre-emption, to subsequently be pre-empted by yet a further resource allocation.

Figure 9:
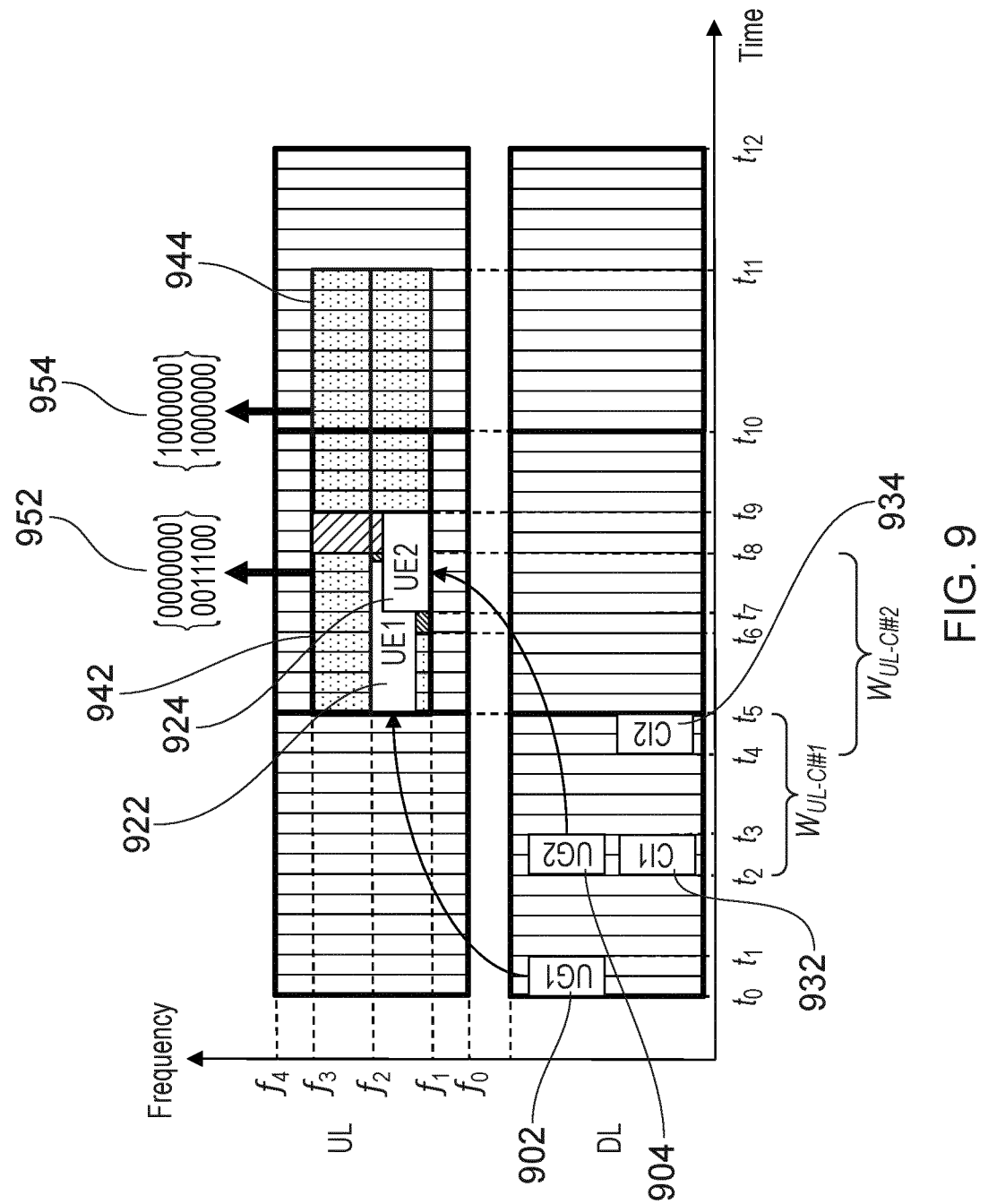
FIG. 9 shows an example of resource allocations and transmissions, including a UL-CI, in accordance with some embodiments of the present disclosure.

FIG. 9 shows an example of transmissions in accordance with some embodiments of the present technique.

In the example of FIG. 9, first communication resources 922 and second communication resources 924 are respectively allocated by first and second uplink grants 902, 904. From time t2 to time t3, both the second uplink grant 904 and a first UL-CI 932 are transmitted. For the first UL-CI 932, the second uplink grant 904 is within the associated first time window $W_{UL-CI\#1}$. Accordingly, the second communications device 270b ignores the first UL-CI 932 when determining whether or not to transmit data using the resources allocated by the second uplink grant 904.

In addition, e.g. subsequently (not shown in FIG. 9), a further (third) resource allocation is made, which comprises third communication resources within the sub-portions bounded in frequency by f1 and f3, and in time by t8 and t9. Within the sub-portion bounded in frequency by f1 and f3, and in time by t8 and t9, the third communication resources collide with (i.e. overlaps) a portion of the second communication resources 924. In response, the infrastructure equipment 272 transmits a second UL-CI 934 from time t4 to time t5. The first and second UL-CIs are associated with respective first and second RURs 942, 944, and comprise respective first and second bitmaps 952, 954. The first and second RURs 942, 944 comprise resources which span in the frequency domain from frequency f1 to frequency f3. In the time domain, the first RUR 942 extends from time t5 until time t10, and the second RUR 944 extends from time t8 until time t11.

The first bitmap 952 indicates the sub-portions of the first RUR 942 which include the second communication resources 942. The second bitmap 954 indicates the sub-portions of the second RUR 944 which include the third communication resources.

Because the second uplink grant 904 is outside of the time window $W_{UL-CI\#2}$ associated with the second UL-CI 934, the second communications device 270b processes the second bitmap 954, determines that the indicated sub-portions include at least a portion of the second communication resources 924, and refrains from transmitting using the second communication resources 924.

In the example of FIG. 9, the first and second bitmaps 952, 954 indicate, by means of a '1', those sub-portions which include a portion of the subsequent resource allocation, wherein the subsequent resource allocation overlaps with (and thus pre-empts) an earlier resource allocation. Accordingly, the first and second bitmaps 952, 954 include bits set to '1' which correspond to (i.e. 'indicate') sub-portions which include a portion of the subsequent resource allocation but do not include any of the earlier resource allocation.

In some embodiments, a UL-CI may indicate only those sub-portions which include both a portion of the subsequent resource allocation and a portion of the earlier resource allocation. For example, referring to FIG. 9, in some embodiments, the first bitmap 952 may indicate only those sub-portions containing the overlap between the first and second communication resources 922, 924, i.e. {0 0 0 0 0 0 0; 0 0 1 1 0 0 0}. Similarly, the second bitmap 954 may indicate only those sub-portions containing the overlap between the second communication resources 924 and the third communication resources, i.e. {0 0 0 0 0 0 0; 1 0 0 0 0 0 0}. As described above, however, in accordance with some embodiments, resources indicated by a bitmap in a UL-CI are not limited to those associated with a collision, but may be indicated for other reasons by the infrastructure equipment. In particular, in some embodiments, a communications device may not determine any reason for the indication of resources in a UL-CI.

As described above and shown in, for example, FIG. 7, in some embodiments, the end of the time window $W_{UL-CI}$ may be determined as being a predetermined duration $T_{AFTER}$ after the end of the resources used to transmit the UL-CI.

In some embodiments, the end of the time window $W_{UL-CI}$ may be determined based on the start or end time of the resources corresponding to the RUR associated with the UL-CI. For example, as shown in FIG. 8 and described above, in some embodiments the time window ends at the start of the RUR. In the example of FIG. 8, for the UL-CI 832, the end of the associated time window $W_{UL-CI}$ is at time t4, which is the start of the RUR 842 of the UL-CI 832.

In some embodiments the time window associated with a UL-CI ends at the end of the corresponding RUR. Accordingly, in some embodiments, an uplink grant may be transmitted and received after the start of an RUR associated with a UL-CI which has previously been transmitted. An example of such transmissions is shown in FIG. 10.

Figure 10:
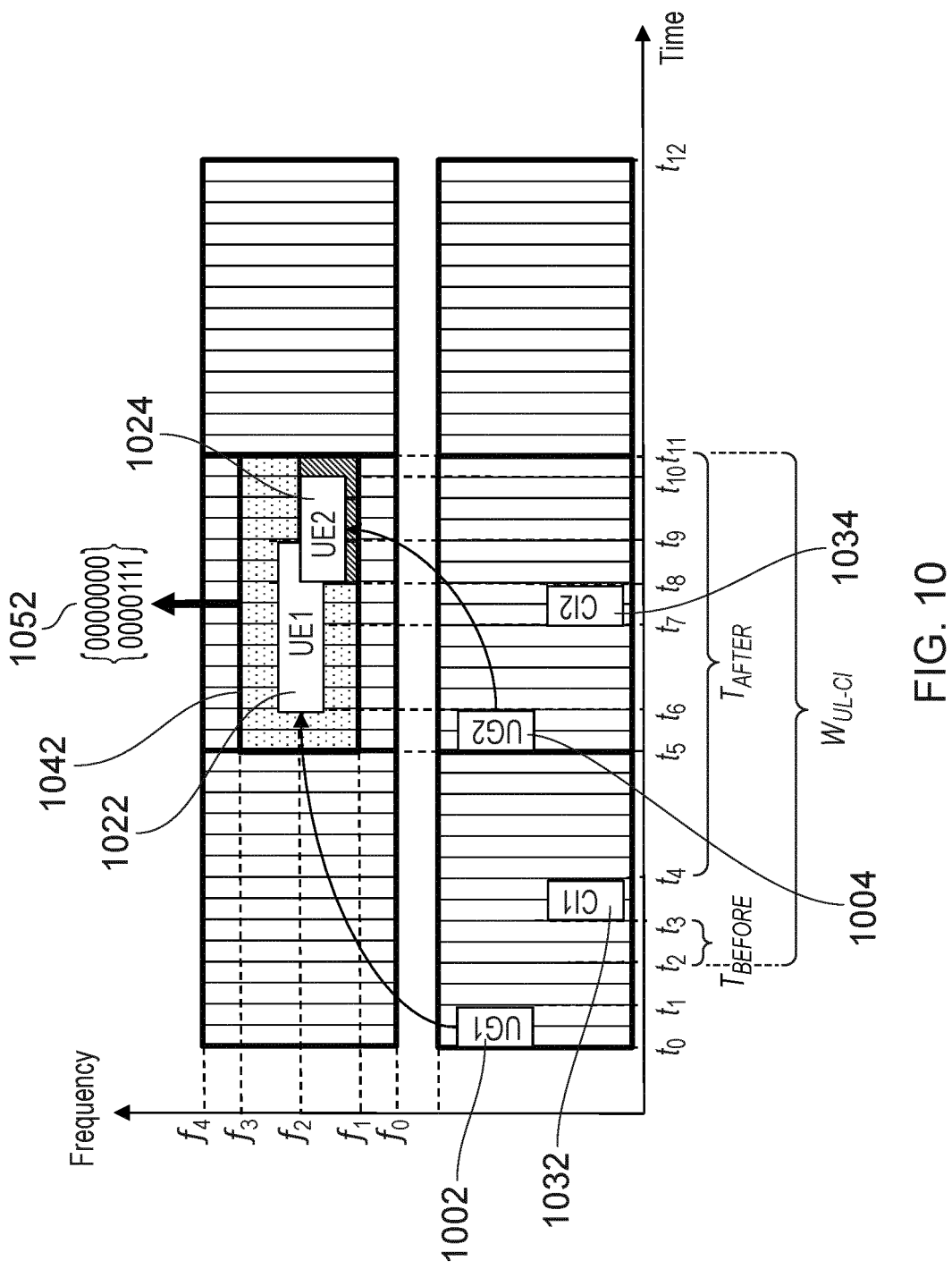
FIG. 10 shows an example of resource allocations and transmissions, including an uplink grant transmitted and received after the start of a reference uplink region (RUR) associated with a UL-CI which has previously been transmitted, in accordance with some embodiments of the present disclosure.

In the example of FIG. 10, first communication resources 1022 are allocated for the transmission of data by the first communications device 270a by means of the first uplink grant 1002 transmitted from time t0 to time t1.

Separately (e.g. after time t1), the infrastructure equipment 272 allocates second communication resources 1024 for the transmission of data by the second communications device 270b. From time t3 to time t4, the infrastructure equipment 272 transmits the first UL-CI 1032, having an associated RUR 1042 which extends in time from time t5 until time t11. Accordingly, the time window $W_{UL-CI}$ associated with the first UL-CI 1032 extends until time t11, being the end of the RUR 1042. The UL-CI 1032 indicates by means of bitmap 1052 those sub-portions within which the first and second communications resources 1022, 1024 collide.

Because the time window $W_{UL-CI}$ extends after the end of the transmission of the UL-CI 1032, it is not necessary that a transmission of an uplink grant for the second communication resources 1024 is prior to, or simultaneously with, the transmission of the UL-CI 1032.

As in some embodiments of the present technique, the first UL-CI 1032 may be transmitted in accordance with a predetermined schedule for UL-CI transmissions which are to be monitored by the first and second communications devices 270a, 270b.

The infrastructure equipment 272 transmits, from time t5 to time t6, the second uplink grant 1004 to indicate the allocation of the second communication resources 1024 to the second communications device 270b. Because the second uplink grant 1004 is within the time window $W_{UL-CI}$ associated with the first UL-CI 1032, the second communications device 270b does not refrain from transmitting data using the second communication resources 1024.

In contrast, because the time window $W_{UL-CI}$ associated with the first UL-CI 1032 starts at time t2, which is after the transmission of the first uplink grant 1002, the first communications device 270a determines that it is to refrain from transmitting using the first communication resources 1022, since the bitmap 1052 indicates sub-portions which include some or all of the first communication resources 1022.

Accordingly, embodiments of the present technique can permit flexibility in selecting a time when an uplink grant is transmitted which allocates resources which have previously been allocated.

In the example of FIG. 10, a second UL-CI 1034 is transmitted between time t7 and t8. Although not shown in FIG. 10, the time window associated with the second UL-CI 1034 starts at or after time t6, when the transmission/reception of the second uplink grant 1004 ends. Accordingly, in accordance with some embodiments, the second communications device 270b complies with (e.g. refrains from transmitting using allocated resources) any indication of resources which is applicable to the second communication resources 1024 allocated by means of the second uplink grant 1004 and which is indicated by the second UL-CI 1034.

In some embodiments, the time window associated with a UL-CI does not end (in other words, $T_{AFTER}=\infty$). In such embodiments, a UL-CI transmitted before an uplink grant does not have to be taken into account in determining whether the resources allocated by the uplink grant are to be used for the transmission of data, irrespective of the time between the transmission of the UL-CI and the uplink grant.

In some embodiments, the time window associated with a UL-CI ends at the end of the transmission of the UL-CI, i.e. $T_{AFTER}=0$.

As described above, in some embodiments, an infrastructure equipment transmits UL-CIs to be monitored by communications devices only at certain times, for example in accordance with a predetermined schedule of possible transmission instances, which is known to the communications devices. Such embodiments can reduce an amount of monitoring for UL-CI transmissions required by the communications devices.

The transmission instances may be referred to as monitoring occasions. The UL-CI may be transmitted using conventional techniques for the transmission of downlink control information (DCI), and may be optionally transmitted at any particular monitoring occasion. Although the communications devices are required to receive and detect any UL-CI transmitted at a monitoring occasion, in accordance with the predetermined schedule, the infrastructure equipment may in some embodiments refrain from transmitting a UL-CI at a monitoring occasion if, for example, no pre-emption has occurred in respect of resources within the RUR associated with the UL-CI.

In some such embodiments, the time window associated with a UL-CI transmitted at a first monitoring occasion ends at the start of the next transmission instance after the first monitoring occasion.

Figure 11:
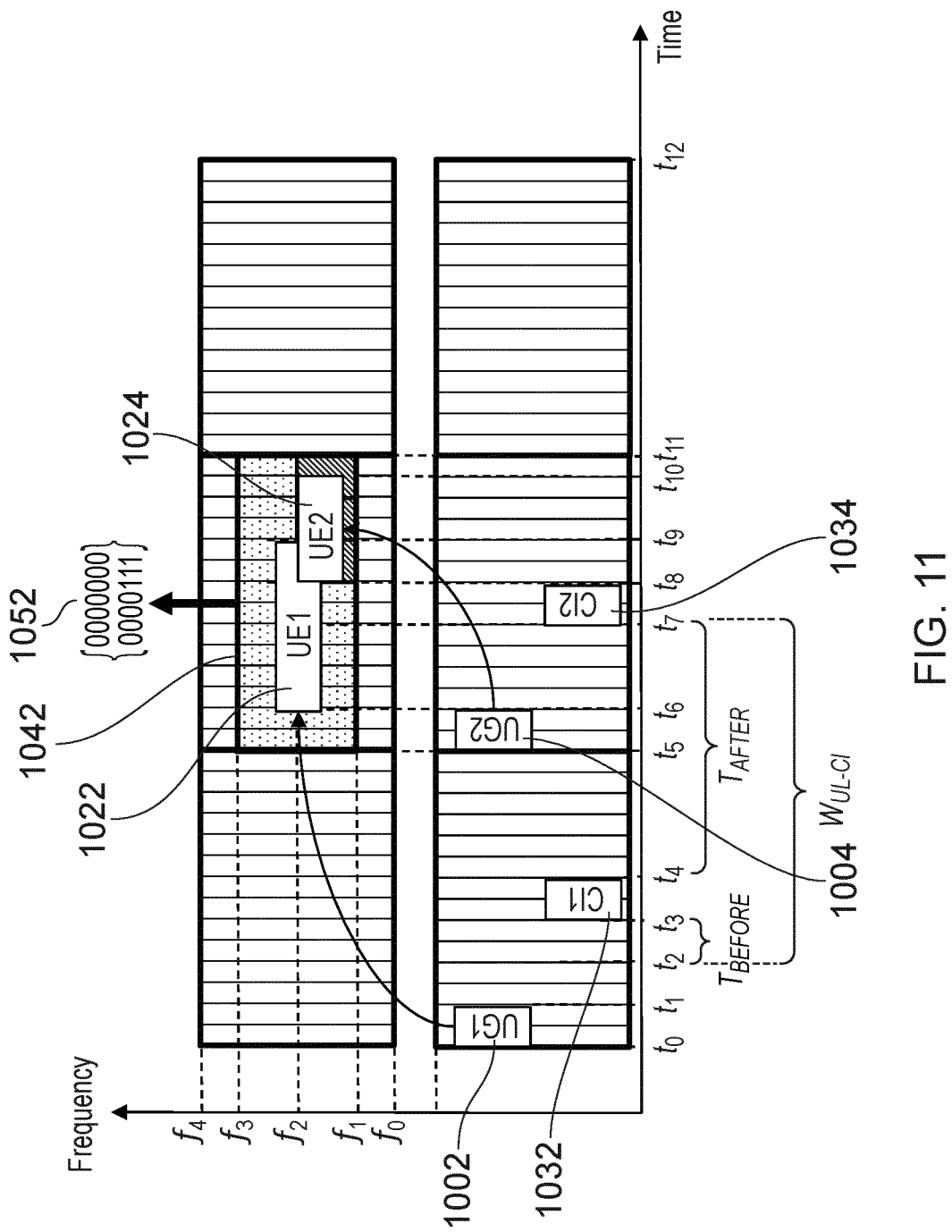
FIG. 11 shows an example of resource allocations and transmissions, including a UL-CI, and an associated time window which ends at the start of a next UL-CI transmission instance, in accordance with some embodiments of the present disclosure.

FIG. 11 shows an example of transmissions, including a UL-CI, and an associated time window which ends at the start of a next UL-CI monitoring occasion, in accordance with some embodiments of the present disclosure.

The transmissions shown in FIG. 11 are the same as those shown in FIG. 10. However, in the example of FIG. 11, UL-CI monitoring occasions start at times t3 and t7 in accordance with a predetermined schedule, and the time window associated with a UL-CI ends at the start of the next monitoring occasion, as described above.

Accordingly, the time window associated with the first UL-CI 1032 ends at time t7.

In some embodiments, the communications device determines time window determination parameters, for determining a time window associated with a UL-CI. In some embodiments, the time window determination parameters include one or more of:

$T_{BEFORE}$, $T_{AFTER}$, whether the end of the time window aligns with the start or end of the associated RUR whether the end of the time window aligns with a start of a next UL-CI monitoring occasion, in accordance with a UL-CI transmission schedule.

In some embodiments one or more of the time window determination parameters are statically configured (e.g. at manufacture, or by means of software update) in the communications device. The time window determination parameters may be defined in an appropriate standards specification. Accordingly, there may be no need for any signalling of the time window determination parameters.

In some embodiments, one or more of the time window determination parameters are configured in the communications device by radio resource control configuration or other configuration means provided at a protocol layer above a medium access control layer. Accordingly, embodiments of the present technique can provide for flexible setting of the parameters.

In some embodiments, an indication of one or more of the time window determination parameters is transmitted to the communications device by signalling at a medium access control layer or lower protocol layer. For example, parameters may be signalled within downlink control information (DCI). In some embodiments, the DCI comprising an indication of the parameters may also comprise an uplink grant or a UL-CI. Accordingly, embodiments of the present technique can provide for dynamic setting of the parameters.

As described above, embodiments of the present technique can allow for a UL-CI to be selectively applicable to different uplink grant indications, depending on the relative transmission times of the UL-CI and the uplink grants.

However, this may impose some constraint on the scheduling of the uplink grants, in order to ensure that one (which is to be, in effect, cancelled by the UL-CI) is outside of the time window of the UL-CI and that the other is not.

Figure 12:
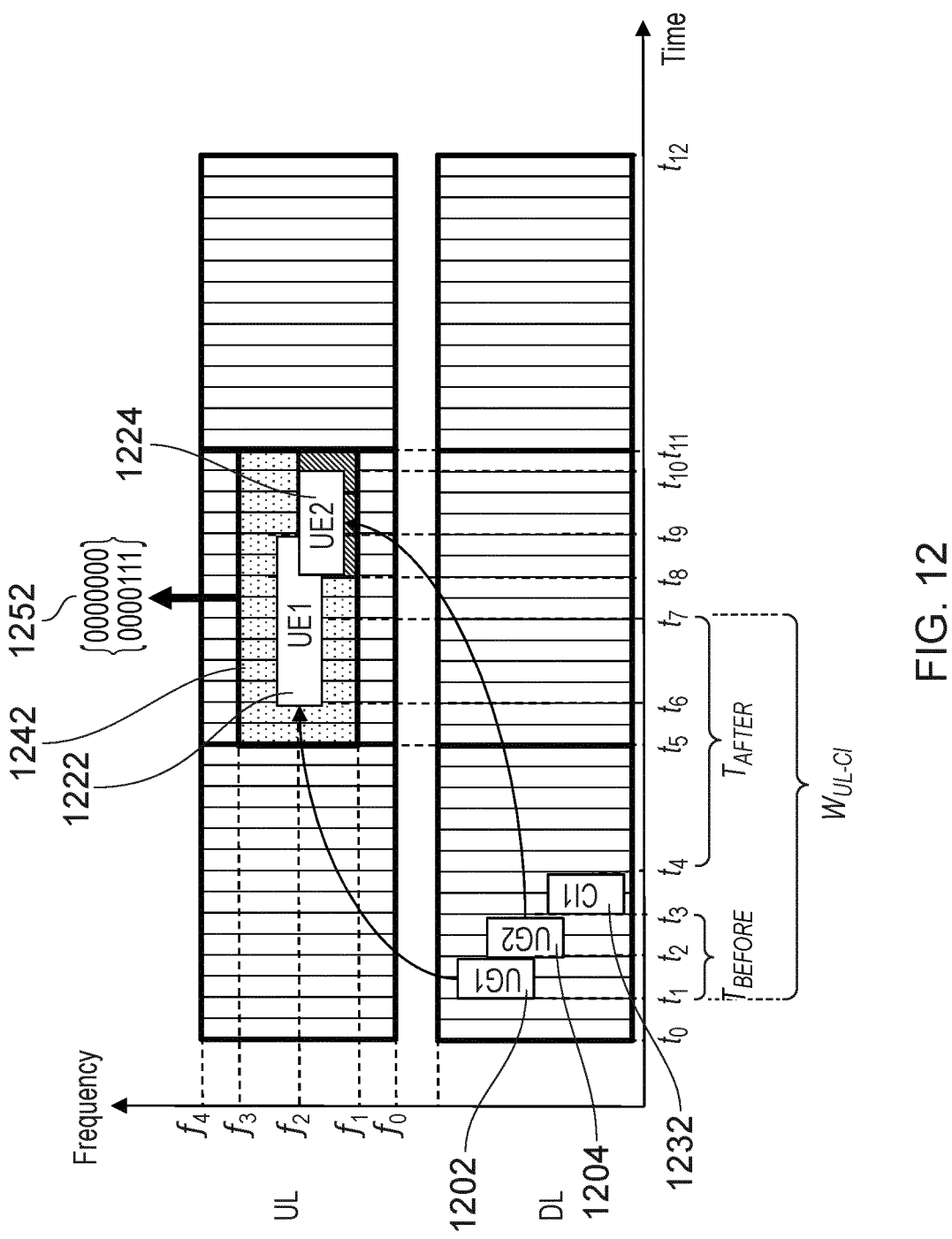
FIG. 12 shows an example of resource allocations and transmissions where two uplink grants are separated in time and both are treated equally.

FIG. 12 shows an example of a scenario where two uplink grants are separated in time but are nevertheless both treated equally.

In FIG. 12, first and second communication resources 1222, 1224 are allocated as in the example of FIG. 11, and UL-CI 1232 is transmitted to indicate, by means of bitmap 1252, sub-portions of the RUR 1242 associated with the UL-CI 1232, the indicated sub-portions being those including the overlapping resources.

Unlike the example of FIG. 11, in FIG. 12, the first and second uplink grants 1202, 1204 are transmitted respectively at times t1 and t2, which are both within the time window $W_{UL-CI}$ associated with the UL-CI 1232. The reason for the transmission timing of the first and second uplink grants 1202, 1204 may be, for example, because of the lack of availability of other suitable communication resources for transmitting the uplink grants 1202, 1204. In some embodiments, the infrastructure equipment may determine that an uplink grant must be transmitted so that the time between the transmission of the uplink grant and the start of the resources allocated by the uplink grant exceeds a predetermined duration, in order to allow the communications device sufficient time to respond to the uplink grant to prepare data for transmission (e.g. by performing encoding steps) and to prepare transmitter circuitry for transmission of the data using the allocated communications resources.

Because both the first and second uplink grants 1202, 1204 are transmitted within the time window $W_{UL-CI}$ associated with the UL-CI 1232, both the first communications device 270a and the second communications device 270b (being beneficiaries of the first and second uplink grants, respectively), do not refrain from transmitting using the first (respectively, second) communications resources 1222, 1224. This is not the desired outcome in this example, because both communications devices 270a, 270b transmit resulting in a collision and likely failure of the infrastructure equipment 272 to decode one or both transmissions successfully.

A further problem may arise if both the first and second uplink grants 1202, 1204 are transmitted outside of the time window $W_{UL-CI}$ associated with the UL-CI 1232; for example because in the example of FIG. 12, $T_{BEFORE}=0$, so that the time window $W_{UL-CI}$ starts at time t3. Then, both communications devices 270a, 270b would cancel their transmissions using the first and second uplink communication resources 1222, 1224.

In accordance with some embodiments of the present technique, the infrastructure equipment 272 transmits, to the same communications device, two uplink grants for the same communication resources, and also transmits a UL-CI indicating the communication resources. In some embodiments, the two uplink grants indicate consistent parameters, such as encoding parameters, block size, and so on, so that any encoding process(es) initiated in response to the first of the two uplink grants is/are consistent with (i.e. in accordance with) any parameters indicated in the second of the two uplink grants. In some embodiments, the second (later) uplink grant contains reduced parameters, for example the second uplink grant can comprise an indicator which indicates that the first (earlier) grant is confirmed. The indicator may be, for example, a 1 bit indicator to either confirm or not confirm the transmission of the first (earlier) uplink grant.

One of the uplink grants is transmitted within the time window associated with the UL-CI. In particular, the one of the uplink grants transmitted within the time window is the second of the two uplink grants.

Accordingly, the communications device receives a first uplink grant indicating allocated communication resources. In response to receiving the first uplink grant, the communications device may begin preparatory steps for transmitting data using the allocated communication resources. Subsequently, the communications device receives a UL-CI indicating the allocated communication resources (or a portion thereof), wherein the first uplink grant was received outside of the time window associated with the UL-CI.

The communications device receives, during the time window associated with the UL-CI, a second uplink grant allocating the same communication resources as allocated by the first uplink grant. In response to receiving the second uplink grant and determining that it was received during the time window associated with the UL-CI, the communications device determines that it is not to refrain from transmitting using the allocated communication resources, irrespective of the resources indicated by the UL-CI.

Figure 13:
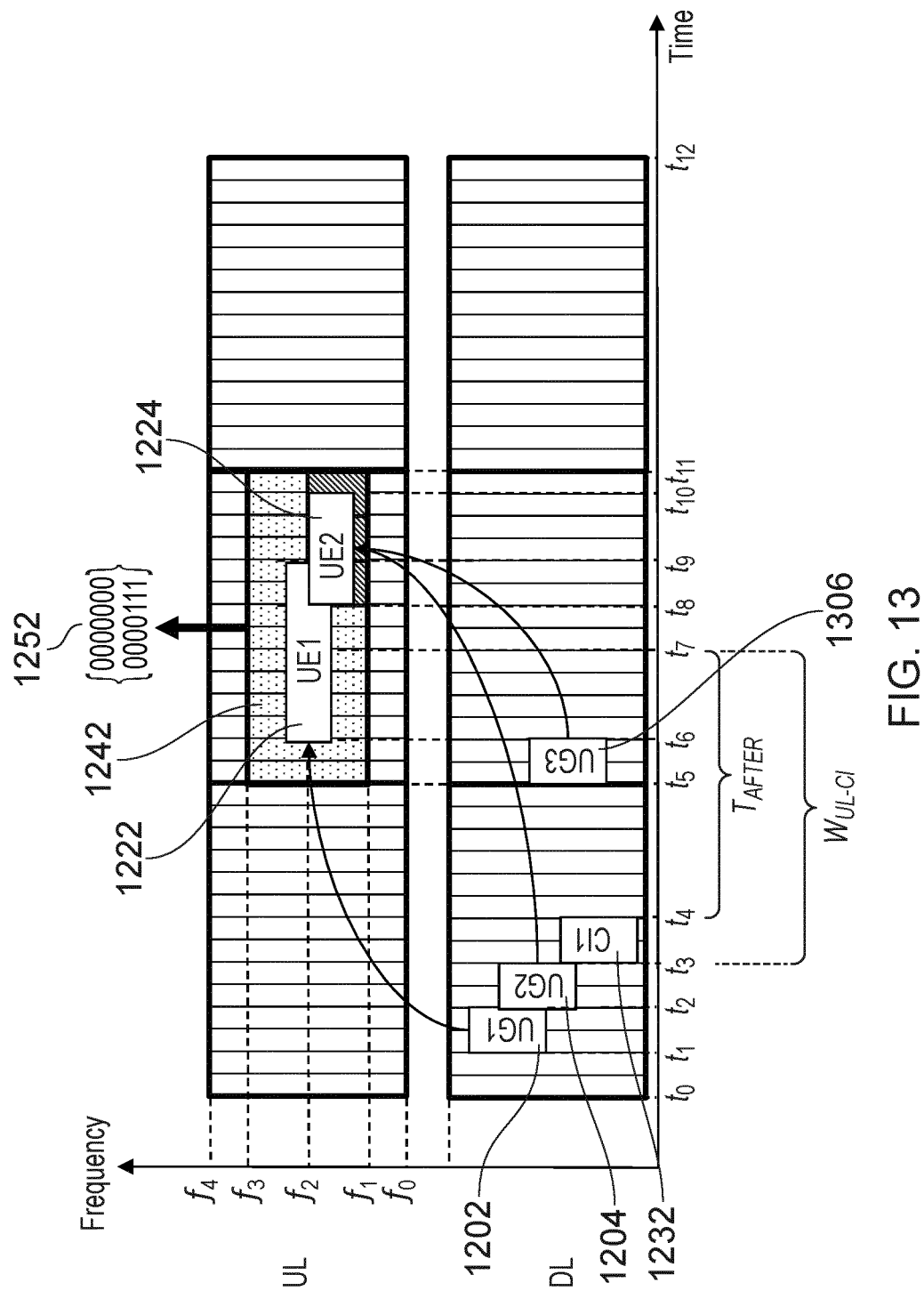
FIG. 13 illustrates resource allocations and a sequence of transmissions in accordance with embodiments of the present disclosure.

An example of this is shown in FIG. 13.

FIG. 13 shows the same resource allocations as in the example of FIG. 12. However, in the example of FIG. 13, an additional (third) uplink grant 1306 is transmitted at time t5, within the time window $W_{UL-CI}$ associated with the UL-CI 1232. The third uplink grant 1306 allocates the second communication resources 1224 to the second communications device 270b, i.e. it allocates the same resources, to the communications device, as the second uplink grant 1204.

Because the first uplink grant 1202 is received outside (before) the time window $W_{UL-CI}$ associated with the UL-CI 1232, the first communications device 270a acts on the indication of the first communication resources 1222 (or portion thereof), as indicated by the bitmap 1252 within the UL-CI 1232, and refrains from transmitting data using the first communication resources 1222.

On the other hand, the second communications device receives the third uplink grant 1306 which is received within the time window $W_{UL-CI}$ associated with the UL-CI 1232. In response, it determines that it should not act on the indication of the second communication resources 1224 (or portion thereof), as indicated by the bitmap 1252 within the UL-CI 1232, and transmits data using the second communication resources 1224.

Accordingly, embodiments of the present technique can permit an infrastructure equipment to transmit an uplink grant sufficiently early to allow the communications device to complete necessary preparations for transmission, and to indicate that a UL-CI is not to apply to (i.e. may be ignored by) the communications device in respect of the allocated resources.

In accordance with some embodiments of the present technique, the communications device performs steps in preparation for the transmission of the data using the second uplink communication resources 1224 in response to receiving the second uplink grant 1204, and the third uplink grant 1306 indicates parameters for the transmission of the data which are consistent with these preparation steps (e.g. the modulation and coding scheme, transport block size and the like indicated by the second uplink grant 1204 and the third uplink grant 1306 are not in conflict) or the third uplink grant provides an indicator (e.g. a 1 bit indicator) to indicate whether the transmission should proceed using the second uplink communication resources. Accordingly, embodiments of the present technique can mean that it is not necessary that the third uplink grant 1306 be received sufficiently in advance of the second uplink communications resources 1224 for the communications device to complete the necessary preparatory steps (encoding, and such like) between the receipt of the third uplink grant 1306 and the start of the second uplink communications resources 1224. In particular, this may be beneficial when, in the absence of the third uplink grant 1306, the communications device would have refrained from transmitting using the second uplink communication resources 1224.

In some embodiments (as in the example of FIG. 13), the third uplink grant 1306 must be received within the time window $W_{UL-CI}$ associated with the UL-CI 1232.

In some embodiments, the third uplink grant must (additionally or alternatively) be received within a confirm time window, having duration $T_{confirm}$, which starts at the end of the reception of the UL-CI. The duration $T_{confirm}$ may be defined such that the confirm time window ends a predetermined duration $T_{DCI}$ prior to the start of the allocated communication resources. The duration $T_{confirm}$ may therefore be different for different communications devices, depending on the start time of their respective allocated communication resources. The duration $T_{DCI}$ may be a minimum duration required for a communications device to respond to the receipt of the third uplink grant. The duration $T_{DCI}$ may be specified in a standard, or configured in the communications device 270 by means of RRC configuration or other known techniques.

Figure 14:
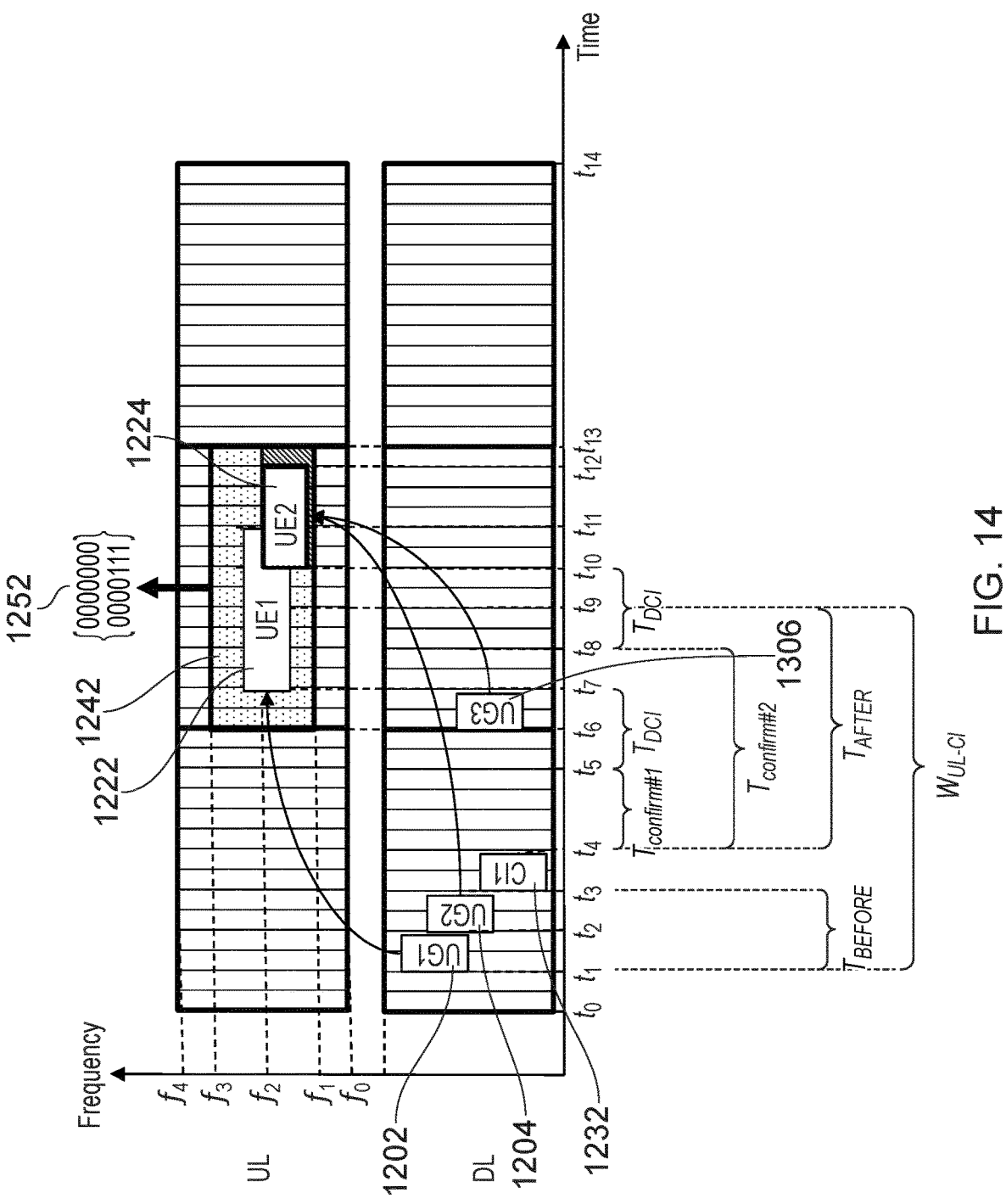
FIG. 14 illustrates resource allocations and transmissions in accordance with embodiments of the present technique, showing the transmission of an uplink grant within a confirm time window.

FIG. 14 illustrates transmissions in accordance with embodiments of the present technique, showing the transmission of an uplink grant within a confirm time window.

The transmissions in the example of FIG. 14 are the same as in the example of FIG. 13. However, in the example of FIG. 14, $T_{BEFORE}$ is greater than zero. The respective determinations by the communications devices 270*a*, 270*b* as to whether to transmit using their respective allocated resources 1222, 1224 are different.

Specifically, the first communications device 270*a* receives the first uplink grant 1202 allocating first uplink resources 1222, and the UL-CI 1232. The first uplink communication resources 1222 start at time t7. The first communications device 270*a* therefore determines that the confirm time window associated with the UL-CI 1232 extends from time t4 (when the reception of the UL-CI 1232 ends) until time t5, where time t5 is a predetermined duration $T_{DCI}$ in advance of time t7 when the first uplink communication resources 1222 start.

Because the first uplink grant 1202 was received during the time window $W_{UL-CI}$ associated with the UL-CI 1232, and no further uplink grant was received during the confirm time window, the first communications device 270*a* processes the UL-CI 1232, for example in a conventional manner, and refrains from transmitting using the first communication resources 1222.

In some embodiments, the first communications device 270*a* refrains from transmitting using the first communication resources 1222 in response to determining that no further uplink grant was received during the confirm time window, irrespective of the time of reception of the first uplink grant 1202. In some such embodiments, there may be no time window $W_{UL-CI}$ associated with the UL-CI 1232.

Alternatively, in some embodiments (not shown in FIG. 14), the first communications device 270*a* refrains from transmitting using the first communication resources 1222 in response to determining that no further uplink grant was received during the confirm time window and the first uplink grant 1202 was not received during the time window Wm-a associated with the UL-CI 1232.

In contrast, the second communications device 270*b* receives the second uplink grant 1204 allocating second uplink resources 1224, and the UL-CI 1232. The second uplink communication resources 1224 start at time t10. The second communications device 270*b* therefore determines that the confirm time window associated with the UL-CI 1232 extends from time t4 (when the reception of the UL-CI 1232 ends) until time t8, where time t8 is $T_{DCI}$ in advance of time t10.

Because the third uplink grant 1306 is received during the confirm time window, confirming the allocation of the second communication resources 1224 to the second communications device 270*b*, the second communications device 270*b* ignores the UL-CI 1232 and transmits data using the second communication resources 1222.

Accordingly, embodiments of the present technique can provide a method of transmitting a confirmation uplink grant after a UL-CI, being received at least a predetermined duration in advance of allocated uplink resources.

In some embodiments, a communications device may receive two UL-CIs having associated RURs, where at least a portion of communication resources allocated to the communications device by an uplink grant falls within both RURs.

In accordance with some embodiments, the communications device refrains from transmitting using the allocated resources only if both UL-CIs indicate some of the allocated communication resources. The indicated communication resources may differ among the UL-CIs. The associated RURs may be the same or different.

Figure 15:
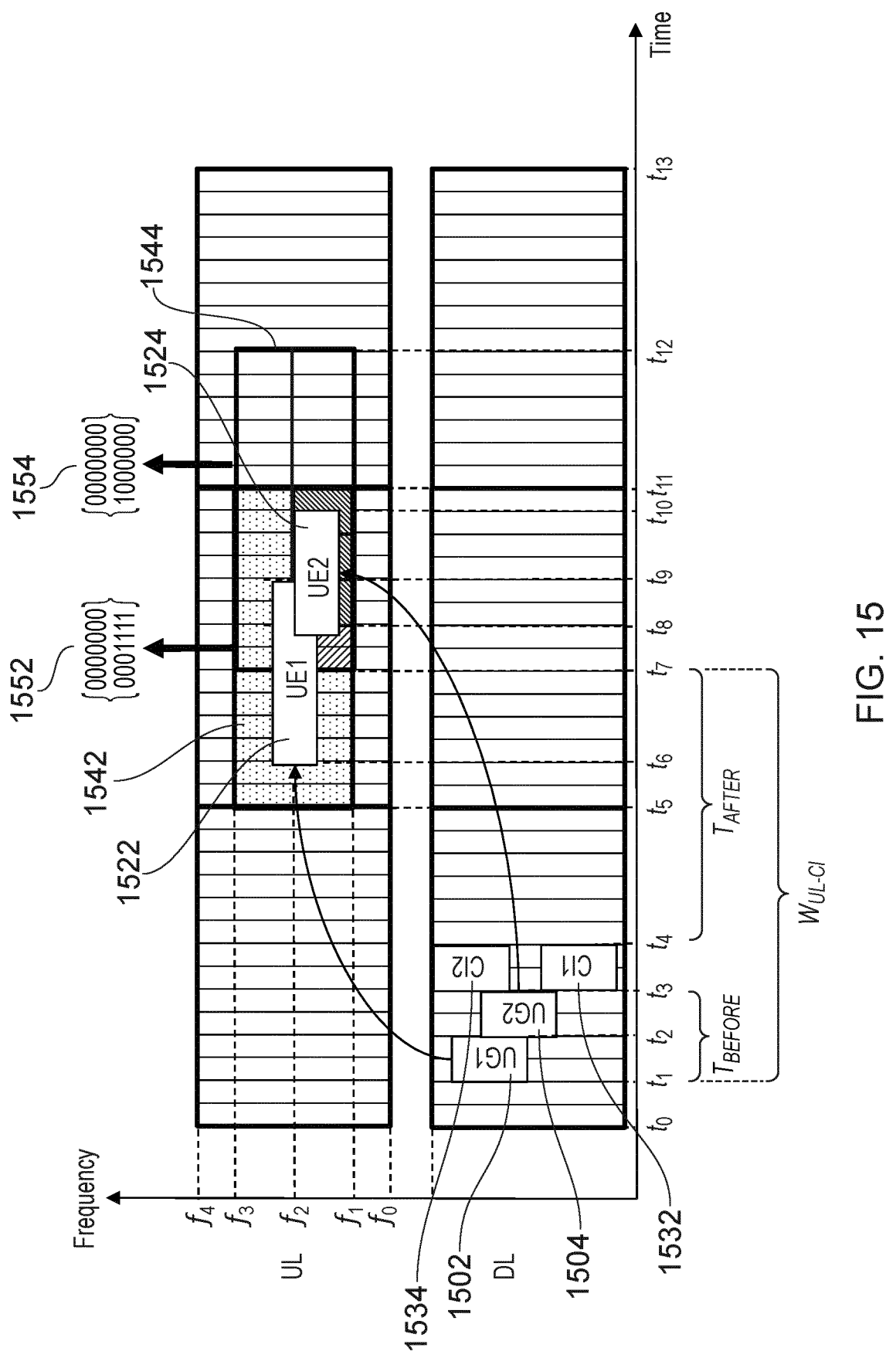
FIG. 15 illustrates resource allocations and transmissions in accordance with embodiments of the present technique in which a communications device refrains from transmitting using allocated resources only if both of two UL-CIs indicate that some of the allocated communication resources are subject to a collision.

An example of such an embodiment is shown in FIG. 15.

In the example of FIG. 15, first and second communication resources 1522, 1524 are allocated respectively to the first and second communications devices 270*a*, 270*b* by means of first and second uplink grant indications 1502, 1504.

First and second UL-CIs 1532, 1534 are also transmitted and received by both the first and the second communications devices 270*a*, 270*b*. Each UL-CI 1532, 1534 is associated with a respective RUR 1542, 1544 and comprises a respective bitmap 1552, 1554 indicating sub-portions of the RUR, the indicated sub-portions being those which include resources of a colliding resource allocation.

The first and second RURs 1542, 1544 extend in frequency from frequency f1 to frequency f3. In the time domain, the first RUR 1542 extends from time t5 to time t11, and the second RUR 1544 extends from time t7 to time t12.

The first communications device determines that both the first RUR 1542 and second RUR 1544 indicate some of the first communication resources 1522. Specifically, the first bitmap 1552 indicates resources spanning from time t7 to time t11 and from frequency f1 to frequency f2. The second bitmap 1554 indicates resources within a sub-portion extending in frequency from frequency f1 to frequency f2, and extending in time from time t7 to time t8. Because both UL-CIs 1532, 1534 indicate a portion of the first communication resources, the first communications device 270*a* refrains from transmitting using the first communication resources 1522.

In contrast, the second bitmap 1554 indicates no sub-portions of the second RUR 1544 which contain resources of the second communication resources 1524. Accordingly, the second communications device 270*b* does not refrain from transmitting using the second communication resources 1524, and transmits data using these resources.

It will be apparent that in some such embodiments, the bitmap of the UL-CI may not in fact reflect the resources (e.g. sub-portions of an RUR) which are subject to a collision. In the example of FIG. 15, the second bitmap 1554 indicates at least some resources within a sub-portion extending in frequency from frequency f1 to frequency f2, and extending in time from time t7 to time t8. However, this sub-portion does not include any of the second communication resources 1524 and so in fact contains no colliding resources.

In some embodiments, other rules for determining whether allocated communications resources are to be used for transmission may be used in addition to, or alternatively to those described above. For example, in some embodiments, different communications devices may be configured to monitor different UL-CIs, including possibly different subsets of a plurality of UL-CIs. In some such embodiments, a communications device may determine that it is permitted to transmit using allocated resources if it receives, in accordance with its configuration, at least one UL-CI which does not indicate any of the allocated resources as being subject to a collision.

In some embodiments, a communications device may determine that it is permitted to transmit using allocated resources if it does not receive, in accordance with its configuration, any UL-CI which indicates any of the allocated resources.

Accordingly, embodiments of the present technique can provide for a communications device to determine whether it is permitted to transmit using allocated communication resources, without constraint on the relative transmission timing of an uplink grant and one or more UL-CIs. Accordingly, for example, an infrastructure equipment can indicate how a collision is to be resolved in favour of one communications device, even where it is not possible for the infrastructure equipment 272 to schedule uplink grant and/or UL-CIs such that, for one communications device, an uplink grant is within a time window associated with a UL-CI and, for another communications devices, an uplink grant is received outside the time window associated with the UL-CI.

Figure 16:
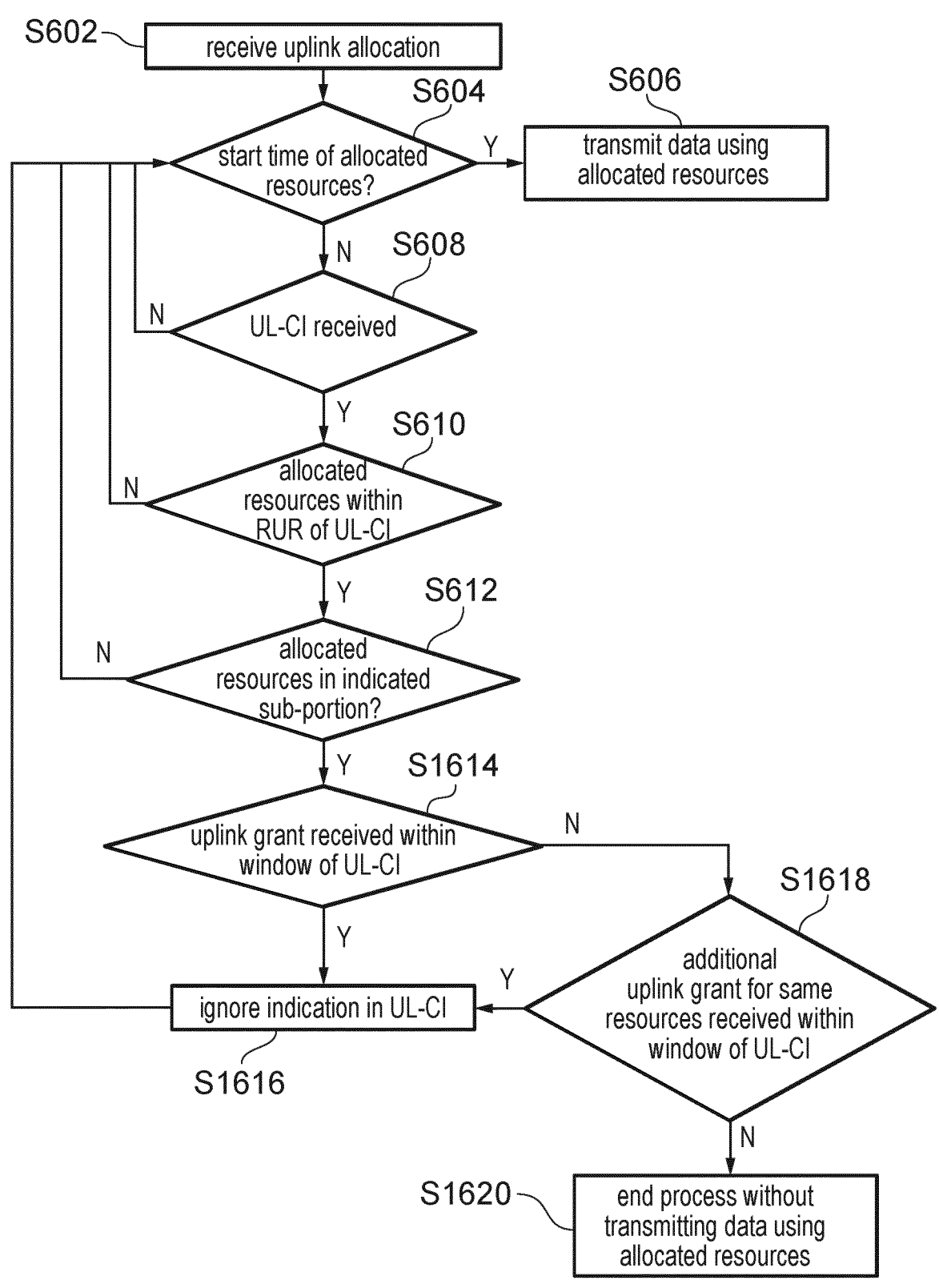
FIG. 16 shows a flow chart for a process which may be implemented by a communications device in accordance with embodiments of the present technique.

FIG. 16 shows a flow chart for a process which may be implemented by a communications device in accordance with embodiments of the present technique.

The process of FIG. 16 includes steps S602, S604, s606, S608, S610 and S612 which correspond to like-numbered steps in the process of FIG. 6 and described above.

As in the process of FIG. 6, if, at step S612, it is determined that none of the first uplink communication resources are within an indicated sub-portion, the control returns to step S604, as in the process of FIG. 6. However, in contrast, if it is determined that some or all of the first uplink communication resources are within an indicated sub-portion, as indicated by the UL-CI, then control passes to step S1614.

At step S1614, the communications device determines the time ("first time") at which the uplink allocation was received (at step S602) and the time ("second time") at which the UL-CI was received (at step S608). Based on the first time and the second time, the communications device determines whether it is permitted to perform the transmission of the data using the allocated resources.

In the example of the process of FIG. 16, this comprises determining an extent of a time window associated with the UL-CI, based on the second time, and determining whether the first time falls within this time window.

It will be appreciated that the second time may refer to the start of the reception of the UL-CI or the end of the reception of the UL-CI; similarly, the first time may refer to the start of the reception of the uplink allocation indication or the end of the reception of the uplink allocation indication. In some embodiments, the time window associated with a UL-CI may be defined based on both the start and end of the reception of the UL-CI. In some embodiments, instead of determining whether the first time falls within the time window, the communications device may determine whether the entire transmission (e.g. the DCI) comprising the uplink grant indication was received within the time window.

If the first time is within the time window then control passes to step S1616.

At step S1616, the communications device determines that although the UL-CI indicates at least a portion of the communications resources allocated at step S602, the communications device is nevertheless permitted to transmit using those allocated resources, and control returns to step S604.

It should be noted that in some embodiments (as in the process of FIG. 6) a further UL-CI may be received, and that the uplink grant received at step S602 may not have been received within the time window associated with the subsequent UL-CI. Accordingly, the determination at step S1616 may not be determinative, in the sense that in some embodiments, the communications device may still refrain from transmitting using the allocated resources based on a subsequent UL-CI.

If, at step S1614, the first time is determined not to be within the time window (or in general, the test based on the first time and second time applied at step S1614 is not satisfied), then control passes to step S1618.

At step S1618, it is determined whether a further uplink grant is received which allocates the same resources as those allocated by the indication (e.g. uplink grant) received at step S602 and, if so, whether the test carried out at step S1614 is satisfied considering the further uplink grant and the UL-CI received at step S608.

If a further uplink grant is received which satisfies the test, then control passes to step S1616, with the result that the communications device is not prevented from transmitting using the allocated resources by the UL-CI received at step S608.

If no further uplink grant is received which satisfies the test, then control passes to step S1620. At step S1620, the process ends without the communications device transmitting uplink data using the resources allocated at step S602.

As described above, and illustrated in FIG. 14 in some embodiments, at step S1618 instead of determining whether a subsequent uplink grant is received within the time window associated with the UL-CI, the communications device determines whether the subsequent uplink grant is received prior to a time which is determined based on the start of the allocated communication resources and, in some embodiments, on a predetermined duration associated with a minimum time for cancelling or preparing for a transmission.

It will be appreciated that in some embodiments, a further uplink grant may be received, allocating different communication resources which may (in accordance with the process of FIG. 16 or otherwise) be used for the transmission of the data by the communications device.

It will be appreciated that the scope of the present disclosure is not limited to the process shown in FIG. 16 and described above. In some embodiments of the present technique, the steps of the process of FIG. 16 may be re-ordered, and/or one or more steps may be omitted. For example, in some embodiments, step S1618 is omitted, such that if a UL-CI is received, and the uplink grant does not satisfy the test at step S1614, then control passes directly to step S1620.

In some embodiments, the possibility of receiving a subsequent UL-CI is not considered so that, following step S1616, the communications device waits until the start time of the allocated resources and then proceeds directly to step S606.

As described herein, embodiments of the present technique can avoid two or more communications devices responding in a same way to a UL-CI, such that either no communications device transmits, or both communications devices transmit resulting in a collision. Embodiments of the present technique provide for differing behaviour of communications devices, based on, for example, a relative timing between the receipt of the UL-CI and the receipt of the uplink grant by that communications device.

According to embodiments of the present technique, this behaviour of the communications device is in accordance with predetermined rules. These rules may be specified in appropriate specifications documents, and/or indicated to the communications device by infrastructure equipment (such as the infrastructure equipment 272) of a wireless communications network. Similarly, the behaviour may additionally be in accordance with predetermined parameters which may be specified in appropriate specifications documents and/or indicated to the communications device by the infrastructure equipment or otherwise configured in the communications device.

Further embodiments of the present disclosure can provide a method for an infrastructure equipment to allocate first uplink resources to a first communications device, to subsequently allocate second uplink resources (including some or all of the first uplink resources) to a second communications device (thus resulting in a collision) and to transmit an indication of the collision which is received by both communications devices, wherein the first and second communication device behaviour, in determining whether or not they transmit using their respective allocated resources, is different.

Accordingly, embodiments of the present technique can permit an infrastructure equipment to indicate a collision such that one (and only one) of the affected communications devices determines to transmit using the colliding resources. In some embodiments, the infrastructure equipment selects respective times for a transmission of an indication of the collision, a transmission of an indication of the allocation of the first uplink resources to the first communications device and a transmission of an indication of the allocation of the second uplink resources to the second communications device, such that the second communications resource determines that the indication of the collision may be ignored and further determines to transmit data using the allocated resources in accordance with the techniques disclosed herein.

In some embodiments, the infrastructure equipment transmits a further indication of the collision, and/or a further indication of the allocation of the second uplink resources to the second communications device, such that the second communications resource determines that the indication of the collision may be ignored and further determines to transmit data using the allocated resources in accordance with the techniques disclosed herein.

In some embodiments, the allocation of the second uplink resources to the second communications device is based on quality of service requirements associated with data to be transmitted by the second communications device using the second uplink resources.

Embodiments of the present technique can avoid a need for additional information to be conveyed within (or transmitted together with) the UL-CI. Embodiments of the present technique can provide for resolution of collisions even if a physical layer priority associated with the data to be transmitted using the colliding resources is the same.

Various examples have been described herein. It will be appreciated that the scope of the disclosure is not limited to the particular combination of features illustrated in these examples, but that aspects of different examples may be combined.

For example, the determination by a communications device that resources which have been allocated for the transmission of data by the communications device have also been allocated for the transmission of data by another communications device may be by means of the bitmap of a UL-CI as described herein, or by any other method, such as by means of receiving a different form of indication. In some embodiments, the indication is a broadcast or multi-cast indication. In some embodiments, the indication does not explicitly indicate which of two overlapping resource allocations are to be cancelled.

Accordingly, embodiments of the present technique can provide a method of operating a communications device in a wireless communications network, the method comprising: receiving at a first time an uplink grant indication, the uplink grant indication indicating first uplink communication resources allocated for the transmission of first data by the communications device, receiving at a second time an uplink cancellation indication (UL-CI), the UL-CI indicating second uplink communication resources, the second uplink communication resources including at least a portion of the first uplink communication resources, and in response to receiving the uplink grant information and the uplink cancellation indication, determining based on the first time and the second time whether to transmit the first data using the first uplink communication resources.

There has also been described a method of operating a communications device in a wireless communications network, the method comprising: receiving an uplink grant indication, the uplink grant indication indicating first uplink communication resources allocated for the transmission of first data by the communications device, receiving at a second time an uplink cancellation indication (UL-CI), the UL-CI indicating resources within a reference uplink region, the reference uplink region associated with the UL-CI and defining uplink communication resources, determining that the first uplink communication resources are within the resources indicated by the UL-CI, determining a time window associated with the UL-CI, determining that the uplink grant indication was received within the time window associated with the UL-CI, and in response to determining that the uplink grant indication was received within the time window associated with the UL-CI, transmitting the first data using the first uplink communication resources.

There has also been described a method of operating a communications device in a wireless communications network, the method comprising: receiving at a first time an uplink grant indication, the uplink grant indication indicating first uplink communication resources allocated for the transmission of first data by the communications device, receiving at a second time an uplink cancellation indication (UL-CI), the UL-CI indicating second uplink communication resources, the second uplink communication resources including at least a portion of the first uplink communication resources, receiving at a third time a second uplink grant indication, the second uplink grant indication indicating that the first uplink communication resources are allocated for the transmission of the first data by the communications device, in response to receiving the second uplink grant indication, and determining based on the third time and the second time whether to transmit the first data using the first uplink communication resources.

There has also been described a method of operating a communications device in a wireless communications network, the method comprising: receiving at a first time an uplink grant indication, the uplink grant indication indicating first uplink communication resources allocated for the transmission of first data by the communications device, receiving at a second time an uplink cancellation indication (UL-CI), the UL-CI indicating second uplink communication resources, the second uplink communication resources including at least a portion of the first uplink communication resources, receiving a second UL-CI, and determining whether to transmit the first data using the first uplink communication resources based on whether the second UL-CI indicates fourth uplink communication resources, the fourth uplink communication resources including at least a portion of the first uplink communication resources.

There has also been described a method of operating an infrastructure equipment in a wireless communications network, the method comprising: transmitting an indication of an allocation of first uplink communication resources to a first communications device, transmitting an uplink cancellation indication (UL-CI) to the first communications device, the UL-CI comprising an indication of communication resources including a portion of the first uplink communication resources, and receiving signals transmitted by the first communications device using the first uplink communications resources.

Corresponding communications devices, infrastructure equipment and circuitry for a communications device and circuitry for infrastructure equipment have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to URLLC/IIoT devices or other low latency communications devices, but can be applied more generally, for example in respect of any type of communications device operating with a wireless link to the communication network.

It will further be appreciated that the principles described herein are applicable not only to LTE-based or 5G/NR-based wireless telecommunications systems, but are applicable for any type of wireless telecommunications system that supports dynamic resource allocation.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a communications device in a wireless communications network, the method comprising: receiving at a first time an uplink grant indication, the uplink grant indication indicating first uplink communication resources allocated for the transmission of first data by the communications device, receiving at a second time an uplink cancellation indication (UL-CI), the UL-CI indicating second uplink communication resources, the second uplink communication resources including at least a portion of the first uplink communication resources, and in response to receiving the uplink grant information and the uplink cancellation indication, determining based on the first time and the second time whether to transmit the first data using the first uplink communication resources.

Paragraph 2. A method according to paragraph 1, wherein the second uplink communication resources include third uplink communication resources which have been allocated both for an uplink transmission of the first data and for an uplink transmission by another communications device.

Paragraph 3. A method according to paragraph 2, wherein the UL-CI indicates that the second uplink communication resources include the third uplink communication resources which have been allocated both for an uplink transmission of the first data and for an uplink transmission by another communications device.

Paragraph 4. A method according to any of paragraphs 1 to 3, the method comprising: when the first time precedes the second time by less than a first pre-determined time, transmitting the first data using the first uplink communication resources.

Paragraph 5. A method according to paragraph 4, wherein the first pre-determined time is zero.

Paragraph 6. A method according to any of paragraphs 1 to 5, the method comprising: when the first time is after the second time and is less than a second pre-determined time later than the second time, transmitting the first data using the first uplink communication resources.

Paragraph 7. A method according to any of paragraphs 1 to 6, the method comprising: when the first time is more than the first pre-determined time earlier than the second time or is more than the second pre-determined time later than the second time, refraining from transmitting the first data using the first uplink communication resources.

Paragraph 8. A method according to any of paragraphs 1 to 7, wherein the UL-CI is associated with a reference uplink region (RUR) defining communication resources comprising the second uplink communication resources.

Paragraph 9. A method according to paragraph 8, wherein the RUR is divided into a plurality of sub-portions of communication resources, and the UL-CI indicates, for each sub-portion, whether communication resources within the sub-portion are within the second communication resources.

Paragraph 10. A method according to any of paragraphs 1 to 9, wherein the second communication resources comprise resources allocated both for the uplink transmission of the first data and for the uplink transmission of the second data.

Paragraph 11. A method according to any of paragraphs 1 to 10, wherein the second communication resources comprise either the first uplink communication resources or the resources allocated for the uplink transmission of the second data.

Paragraph 12. A method according to any of paragraphs 8 to 11, the method comprising when the first time is after the start of the communication resources defined by the RUR, refraining from transmitting the first data using the first uplink communication resources.

Paragraph 13. A method according to any of paragraphs 8 to 11, the method comprising when the first time is after the end of the communication resources defined by the RUR, refraining from transmitting the first data using the first uplink communication resources.

Paragraph 14. A method according to any of paragraphs 1 to 13, wherein the second time is before the first time.

Paragraph 15. A method according to any of paragraphs 1 to 14, wherein determining based on the first time and the second time whether to transmit the first data using the first uplink communication resources comprises determining a time window based on the second time and determining whether the first time is within the time window.

Paragraph 16. A method according to paragraph 15, the method comprising receiving an indication of one or more time window determination parameters, wherein determining a time window based on the second time comprises determining the time window based on the one or more time window determination parameters.

Paragraph 17. A method according to any of paragraphs 1 to 16, the method comprising receiving a UL-CI monitoring indication, the UL-CI monitoring indication indicating the second time and/or indicating that the communications device is to monitor for the UL-CI transmitted at the second time.

Paragraph 18. A method according to any of paragraphs 1 to 17, the method comprising receiving at a third time a second UL-CI.

Paragraph 19. A method according to paragraph 18, the method comprising in response to receiving the uplink grant information and the second UL-CI, determining based on the first time and the third time whether to transmit the first data using the first uplink communication resources.

Paragraph 20. A method according to paragraph 18 or paragraph 19, the method comprising determining whether to transmit the first data using the first uplink communication resources based on whether the second UL-CI indicates fourth uplink communication resources, the fourth uplink communication resources including at least a portion of the first uplink communication resources.

Paragraph 21. A method according to paragraph 20, wherein the second UL-CI indicates whether the fourth uplink communication resources include fifth uplink communication resources which have been allocated for an uplink transmission of the first data and for an uplink transmission of other data.

Paragraph 22. A method according to paragraph 20 or paragraph 21, the method comprising when the second UL-CI does not indicate any portion of the first uplink communication resources, transmitting the first data using the first communication resources.

Paragraph 23. A method according to any of paragraphs 1 to 22, the method comprising receiving at a fourth time a second uplink grant indication, the second uplink grant indication indicating that the first uplink communication resources are allocated for the transmission of first data by the communications device, and in response to receiving the second uplink grant indication, determining based on the fourth time and the second time whether to transmit the first data using the first uplink communication resources.

Paragraph 24. A method according to paragraph 23, the method comprising when the fourth time precedes the start of the first uplink communication resources by less than a minimum time required for the communications device to prepare for an uplink transmission in response to receiving an initial indication of allocated uplink communication resources, transmitting the first data using the first uplink communication resources.

Paragraph 25. A method according to paragraph 23 or paragraph 24, the method comprising when the second uplink grant indication is received before an end of a confirm time window, transmitting data using the first uplink communication resources.

Paragraph 26. A method according to paragraph 25, the method comprising determining that the end of the confirm time window occurs a predetermined duration before the start of the first uplink communication resources.

Paragraph 27. A method according to any of paragraphs 1 to 26, wherein the uplink cancellation indication (UL-CI) is received in downlink control information (DCI).

Paragraph 28. A method according to any of paragraphs 1 to 27, wherein the uplink cancellation indication is broadcast or multicast.

Paragraph 29. A method of operating a communications device in a wireless communications network, the method comprising: receiving an uplink grant indication, the uplink grant indication indicating first uplink communication resources allocated for the transmission of first data by the communications device, receiving at a second time an uplink cancellation indication (UL-CI), the UL-CI indicating resources within a reference uplink region, the reference uplink region associated with the UL-CI and defining uplink communication resources, determining that the first uplink communication resources are within the resources indicated by the UL-CI, determining a time window associated with the UL-CI, determining that the uplink grant indication was received within the time window associated with the UL-CI, and in response to determining that the uplink grant indication was received within the time window associated with the UL-CI, transmitting the first data using the first uplink communication resources.

Paragraph 30. A method according to paragraph 29, wherein the second uplink communication resources include third uplink communication resources which have been allocated both for an uplink transmission of the first data and for an uplink transmission by another communications device.

Paragraph 31. A method according to paragraph 30, wherein the UL-CI indicates that the second uplink communication resources include the third uplink communication resources which have been allocated both for an uplink transmission of the first data and for an uplink transmission by another communications device.

Paragraph 32. A method of operating a communications device in a wireless communications network, the method comprising: receiving at a first time an uplink grant indication, the uplink grant indication indicating first uplink communication resources allocated for the transmission of first data by the communications device, receiving at a second time an uplink cancellation indication (UL-CI), the UL-CI indicating second uplink communication resources, the second uplink communication resources including at least a portion of the first uplink communication resources, receiving at a third time a second uplink grant indication, the second uplink grant indication indicating that the first uplink communication resources are allocated for the transmission of the first data by the communications device, and in response to receiving the second uplink grant indication, determining based on the third time and the second time whether to transmit the first data using the first uplink communication resources.

Paragraph 33. A method of operating a communications device in a wireless communications network, the method comprising: receiving at a first time an uplink grant indication, the uplink grant indication indicating first uplink communication resources allocated for the transmission of first data by the communications device, receiving at a second time an uplink cancellation indication (UL-CI), the UL-CI indicating second uplink communication resources, the second uplink communication resources including at least a portion of the first uplink communication resources, receiving a second UL-CI, and determining whether to transmit the first data using the first uplink communication resources based on whether the second UL-CI indicates fourth uplink communication resources, the fourth uplink communication resources including at least a portion of the first uplink communication resources.

Paragraph 34. A method according to paragraph 33, the method comprising when the second UL-CI does not indicate any portion of the first uplink communication resources, transmitting the first data using the first communication resources.

Paragraph 35. A method of operating an infrastructure equipment in a wireless communications network, the method comprising: transmitting an indication of an allocation of first uplink communication resources to a first communications device, transmitting an uplink cancellation indication (UL-CI) to the first communications device, the UL-CI comprising an indication of communication resources including a portion of the first uplink communication resources, and receiving signals transmitted by the first communications device using the first uplink communications resources.

Paragraph 36. A method according to paragraph 35, wherein the UL-CI is associated with a time window, and the indication of the allocation of the first uplink communication resources is transmitted to the first communications device within the time window.

Paragraph 37. A method according to paragraph 35 or paragraph 36, the method comprising transmitting an indication of an allocation of second uplink communication resources to a second communications device, wherein the second uplink communication resources comprise at least a colliding portion of the first uplink communication resources, the UL-CI is transmitted to the second communications device, and no signals are transmitted by the second communications device using the second uplink communications resources.

Paragraph 38. A method according to paragraph 37, wherein the indication of the allocation of the second uplink communication resources is not transmitted to the second communications device within the time window.

Paragraph 39. A method according to any of paragraphs 35 to 38, the method comprising transmitting an indication of one or more time window determination parameters for allowing one or both of the first and second communications devices to determine the time window.

Paragraph 40. A method according to any of paragraphs 35 to 39, wherein the UL-CI is transmitted in accordance with a schedule of monitoring occasions, the method comprising transmitting an indication of the schedule to one or both of the first and second communications devices.

Paragraph 41. A method according to any of paragraphs 35 to 40, wherein transmitting the uplink cancellation indication (UL-CI) to the first communications device comprises transmitting the UL-CI to a plurality of communications devices including the first communications device.

Paragraph 42. A communications device for operating in a wireless communications network, the communications device comprising a transmitter configured to transmit signals via a wireless access interface provided by an infrastructure equipment in a cell of the wireless communications network, a receiver configured to receive signals via the wireless access interface, and a controller configured to control the transmitter and the receiver so that the communications device is operable: to receive at a first time an uplink grant indication, the uplink grant indication indicating first uplink communication resources of the wireless access interface allocated for the transmission of first data by the communications device, to receive at a second time an uplink cancellation indication (UL-CI), the UL-CI indicating second uplink communication resources, the second uplink communication resources including at least a portion of the first uplink communication resources, and in response to receiving the uplink grant information and the uplink cancellation indication, to determine based on the first time and the second time whether to transmit the first data using the first uplink communication resources.

Paragraph 43. Circuitry for a communications device for operating in a wireless communications network, the circuitry comprising transmitter circuitry configured to transmit signals via a wireless access interface provided by an infrastructure equipment in a cell of the wireless communications network, receiver circuitry configured to receive signals via the wireless access interface, and controller circuitry configured to control the transmitter circuitry and the receiver circuitry so that the communications device is operable: to receive at a first time an uplink grant indication, the uplink grant indication indicating first uplink communication resources of the wireless access interface allocated for the transmission of first data by the communications device, to receive at a second time an uplink cancellation indication (UL-CI), the UL-CI indicating second uplink communication resources, the second uplink communication resources including at least a portion of the first uplink communication resources, and in response to receiving the uplink grant information and the uplink cancellation indication, to determine based on the first time and the second time whether to transmit the first data using the first uplink communication resources.

Paragraph 44. A communications device for operating in a wireless communications network, the communications device comprising a transmitter configured to transmit signals via a wireless access interface provided by an infrastructure equipment in a cell of the wireless communications network, a receiver configured to receive signals via the wireless access interface, and a controller configured to control the transmitter and the receiver so that the communications device is operable: to receive an uplink grant indication, the uplink grant indication indicating first uplink communication resources of the wireless access interface allocated for the transmission of first data by the communications device, to receive at a second time an uplink cancellation indication (UL-CI), the UL-CI indicating resources within a reference uplink region, the reference uplink region associated with the UL-CI and defining uplink communication resources, to determine that the first uplink communication resources are within the resources indicated by the UL-CI, to determine a time window associated with the UL-CI, to determine that the uplink grant indication was received within the time window associated with the UL-CI, and in response to determining that the uplink grant indication was received within the time window associated with the UL-CI, to transmit the first data using the first uplink communication resources.

Paragraph 45. Circuitry for a communications device for operating in a wireless communications network, the circuitry comprising transmitter circuitry configured to transmit signals via a wireless access interface provided by an infrastructure equipment in a cell of the wireless communications network, receiver circuitry configured to receive signals via the wireless access interface, and controller circuitry configured to control the transmitter circuitry and the receiver circuitry so that the communications device is operable: to receive an uplink grant indication, the uplink grant indication indicating first uplink communication resources of the wireless access interface allocated for the transmission of first data by the communications device, to receive at a second time an uplink cancellation indication (UL-CI), the UL-CI indicating resources within a reference uplink region, the reference uplink region associated with the UL-CI and defining uplink communication resources, to determine that the first uplink communication resources are within the resources indicated by the UL-CI, to determine a time window associated with the UL-CI, to determine that the uplink grant indication was received within the time window associated with the UL-CI, and in response to determining that the uplink grant indication was received within the time window associated with the UL-CI, to transmit the first data using the first uplink communication resources.

Paragraph 46. A communications device for operating in a wireless communications network, the communications device comprising a transmitter configured to transmit signals via a wireless access interface provided by an infrastructure equipment in a cell of the wireless communications network, a receiver configured to receive signals via the wireless access interface, and a controller configured to control the transmitter and the receiver so that the communications device is operable: to receive at a first time an uplink grant indication, the uplink grant indication indicating first uplink communication resources of the wireless access interface allocated for the transmission of first data by the communications device, to receive at a second time an uplink cancellation indication (UL-CI), the UL-CI indicating second uplink communication resources, the second uplink communication resources including at least a portion of the first uplink communication resources, to receive at a third time a second uplink grant indication, the second uplink grant indication indicating that the first uplink communication resources are allocated for the transmission of the first data by the communications device, and in response to receiving the second uplink grant indication, to determine based on the third time and the second time whether to transmit the first data using the first uplink communication resources.

Paragraph 47. Circuitry for a communications device for operating in a wireless communications network, the circuitry comprising transmitter circuitry configured to transmit signals via a wireless access interface provided by an infrastructure equipment in a cell of the wireless communications network, receiver circuitry configured to receive signals via the wireless access interface, and controller circuitry configured to control the transmitter circuitry and the receiver circuitry so that the communications device is operable: to receive at a first time an uplink grant indication, the uplink grant indication indicating first uplink communication resources of the wireless access interface allocated for the transmission of first data by the communications device, to receive at a second time an uplink cancellation indication (UL-CI), the UL-CI indicating that second uplink communication resources, the second uplink communication resources including at least a portion of the first uplink communication resources, to receive at a third time a second uplink grant indication, the second uplink grant indication indicating that the first uplink communication resources are allocated for the transmission of the first data by the communications device, and in response to receiving the second uplink grant indication, to determine based on the third time and the second time whether to transmit the first data using the first uplink communication resources.

Paragraph 48. A communications device for operating in a wireless communications network, the communications device comprising a transmitter configured to transmit signals via a wireless access interface provided by an infrastructure equipment in a cell of the wireless communications network, a receiver configured to receive signals via the wireless access interface, and a controller configured to control the transmitter and the receiver so that the communications device is operable: to receive at a first time an uplink grant indication, the uplink grant indication indicating first uplink communication resources of the wireless access interface allocated for the transmission of first data by the communications device, to receive at a second time an uplink cancellation indication (UL-CI), the UL-CI indicating that second uplink communication resources, the second uplink communication resources including at least a portion of the first uplink communication resources, to receive a second UL-CI, and to determine whether to transmit the first data using the first uplink communication resources based on whether the second UL-CI indicates fourth uplink communication resources, the fourth uplink communication resources including at least a portion of the first uplink communication resources.

Paragraph 49. Circuitry for a communications device for operating in a wireless communications network, the circuitry comprising transmitter circuitry configured to transmit signals via a wireless access interface provided by an infrastructure equipment in a cell of the wireless communications network, receiver circuitry configured to receive signals via the wireless access interface, and controller circuitry configured to control the transmitter circuitry and the receiver circuitry so that the communications device is operable: to receive at a first time an uplink grant indication, the uplink grant indication indicating first uplink communication resources of the wireless access interface allocated for the transmission of first data by the communications device, to receive at a second time an uplink cancellation indication (UL-CI), the UL-CI indicating that second uplink communication resources, the second uplink communication resources including at least a portion of the first uplink communication resources, to receive a second UL-CI, and to determine whether to transmit the first data using the first uplink communication resources based on whether the second UL-CI indicates fourth uplink communication resources, the fourth uplink communication resources including at least a portion of the first uplink communication resources.

Paragraph 50. Infrastructure equipment for use in a wireless communications network, the infrastructure equipment providing a wireless access interface for communicating with a communications device in a cell, the infrastructure equipment comprising a transmitter configured to transmit signals to the communications device via the wireless access interface, a receiver configured to receive signals from the communications device, and a controller configured to control the transmitter and the receiver so that the infrastructure equipment is operable to transmit an indication of an allocation of first uplink communication resources to a first communications device, to transmit an uplink cancellation indication (UL-CI) to the first communications device, the UL-CI comprising an indication of communication resources including a portion of the first uplink communication resources, and to receive signals transmitted by the first communications device using the first uplink communications resources.

Paragraph 51. Circuitry for infrastructure equipment for use in a wireless communications network, the infrastructure equipment providing a wireless access interface for communicating with a communications device in a cell, the circuitry comprising transmitter circuitry configured to transmit signals to the communications device via the wireless access interface, receiver circuitry configured to receive signals from the communications device, and controller circuitry configured to control the transmitter circuitry and the receiver circuitry so that the infrastructure equipment is operable to transmit an indication of an allocation of first uplink communication resources to a first communications device, to transmit an uplink cancellation indication (UL-CI) to the first communications device, the UL-CI comprising an indication of communication resources including a portion of the first uplink communication resources, and to receive signals transmitted by the first communications device using the first uplink communications resources.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," 3GPP RAN#81.
[2] Holma H. and Toskala A, "LTE for UMTS OFDMA and SC-FDMA based radio access", John Wiley and Sons, 2009.
[3] 3GPP TR 38.913 "Study on scenarios and requirements for next generation access technologies", Release 14
[4] 3GPP document RP-190726, "Physical layer enhancements for NR ultra-reliable and low latency communication (URLLC)," Huawei, HiSilicon, RAN#83
[5] 3GPP TS 38.212, "NR: Multiplexing and channel coding" v16.0.0

What is claimed is:

1. A method of operating a communications device in a wireless communications network, the method comprising:
   receiving at a time A an uplink grant indication, the uplink grant indication indicating first uplink communication resources allocated for transmission of first data by the communications device,
   receiving at a time B an uplink cancellation indication (UL-CI), the UL-CI indicating second uplink communication resources, the second uplink communication resources including at least a portion of the first uplink communication resources allocated for transmission of second data, and
   in response to receiving the uplink grant indication and the uplink cancellation indication, determining to transmit the first data using the first uplink communication resources based on one relationship between the time A at which the uplink grant indication was received and the time B at which the UL-CI was received and determining to refrain from transmitting the first data using the first uplink communication resources based on another relationship between the time A at which the uplink grant indication was received and the time B at which the UL-CI was received, including:
      when the time A precedes the time B by less than a first pre-determined time, transmitting the first data using the first uplink communication resources, and
      when the time A is after the time B and is less than a second pre-determined time later than the time B, transmitting the first data using the first uplink communication resources.

2. The method according to claim 1, wherein the second uplink communication resources include third uplink communication resources which have been allocated both for an uplink transmission of the first data and for an uplink transmission by another communications device.

3. The method according to claim 2, wherein the UL-CI indicates that the second uplink communication resources include the third uplink communication resources which have been allocated both for the uplink transmission of the first data and for the uplink transmission by the other communications device.

4. The method according to claim 1, wherein the first pre-determined time is zero.

5. The method according to claim 1, the method comprising:

when the time A is more than a first pre-determined time earlier than the time B or is more than a second pre-determined time later than the time B, refraining from transmitting the first data using the first uplink communication resources.

6. The method according to claim 1, wherein the UL-CI is associated with a reference uplink region (RUR) defining communication resources comprising the second uplink communication resources.

7. The method according to claim 6, wherein
the RUR is divided into a plurality of sub-portions of communication resources, and
the UL-CI indicates, for each sub-portion, whether communication resources within the sub-portion are within the second communication resources.

8. The method according to claim 6, the method comprising:

when the time A is after a start of the communication resources defined by the RUR, refraining from transmitting the first data using the first uplink communication resources.

9. The method according to claim 6, the method comprising:

when the time A is after an end of the communication resources defined by the RUR, refraining from transmitting the first data using the first uplink communication resources.

10. The method according to claim 1, wherein the second communication resources comprise resources allocated both for the transmission of the first data and for the transmission of the second data.

11. The method according to claim 1, wherein the second communication resources comprise either the first uplink communication resources or the resources allocated for the uplink transmission of the second data.

12. The method according to claim 1, wherein the time B is before the time A.

13. The method according to claim 1, wherein determining to transmit the first data using the first uplink communication resources comprises:

determining a time window based on the time B, and
determining whether the time A is within the time window.

14. The method according to claim 13, the method comprising:

receiving an indication of one or more time window determination parameters, wherein
determining the time window based on the time B comprises determining the time window based on the one or more time window determination parameters.

15. The method according to claim 1, the method comprising:

receiving a UL-CI monitoring indication, the UL-CI monitoring indication indicating at least one of the time B or that the communications device is to monitor for the UL-CI transmitted at the time B.

16. The method according to claim 1, the method comprising:

receiving at a third time a second UL-CI.

17. A communications device for operating in a wireless communications network, the communications device comprising:

a transmitter configured to transmit signals via a wireless access interface provided by an infrastructure equipment in a cell of the wireless communications network,
a receiver configured to receive signals via the wireless access interface, and
a controller configured to control the transmitter and the receiver so that the communications device is operable:
to receive at a time A an uplink grant indication, the uplink grant indication indicating first uplink communication resources of the wireless access interface allocated for transmission of first data by the communications device,
to receive at a time B an uplink cancellation indication (UL-CI), the UL-CI indicating second uplink communication resources, the second uplink communication resources including at least a portion of the first uplink communication resources allocated for transmission of second data, and
in response to receiving the uplink grant indication and the uplink cancellation indication, to determine to transmit the first data using the first uplink communication resources based on one relationship between the time A at which the uplink grant indication was received and the time B at which the UL-CI was received and determine to refrain from transmitting the first data using the first uplink communication resources based on another relationship between the time A at which the uplink grant indication was received and the time B at which the UL-CI was received, including:
when the time A precedes the time B by less than a first pre-determined time, transmitting the first data using the first uplink communication resources, and
when the time A is after the time B and is less than a second pre-determined time later than the time B, transmitting the first data using the first uplink communication resources.

18. A communications device for operating in a wireless communications network, the communications device comprising:

a transmitter configured to transmit signals via a wireless access interface provided by an infrastructure equipment in a cell of the wireless communications network,
a receiver configured to receive signals via the wireless access interface, and
a controller configured to control the transmitter and the receiver so that the communications device is operable:
to receive an uplink grant indication, the uplink grant indication indicating first uplink communication resources of the wireless access interface allocated for transmission of first data by the communications device,
to receive an uplink cancellation indication (UL-CI), the UL-CI indicating resources within a reference uplink region, the reference uplink region associated with the UL-CI and defining uplink communication resources,
to determine that the first uplink communication resources are within the resources indicated by the UL-CI,
to determine a time window associated with the UL-CI,
to determine that the uplink grant indication was received within the time window associated with the UL-CI, and in response to determining that the uplink grant indication was received within the time window associated with the UL-CI, to transmit the first data using the first uplink communication resources.

* * * * *